US011864161B2

(12) United States Patent
Lee et al.

(10) Patent No.: US 11,864,161 B2
(45) Date of Patent: Jan. 2, 2024

(54) METHOD AND APPARATUS FOR POWER SAVING IN NR V2X

(71) Applicant: LG ELECTRONICS INC., Seoul (KR)

(72) Inventors: Seungmin Lee, Seoul (KR); Daesung Hwang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 17/444,722

(22) Filed: Aug. 9, 2021

(65) Prior Publication Data

US 2022/0078758 A1 Mar. 10, 2022

Related U.S. Application Data

(60) Provisional application No. 63/105,204, filed on Oct. 23, 2020, provisional application No. 63/063,216, filed on Aug. 7, 2020.

(51) Int. Cl.
*H04W 72/02* (2009.01)
*H04L 1/00* (2006.01)
(Continued)

(52) U.S. Cl.
CPC ............ *H04W 72/02* (2013.01); *H04L 1/0003* (2013.01); *H04L 1/1812* (2013.01); *H04L 5/0051* (2013.01); *H04W 72/0446* (2013.01); *H04W 72/1263* (2013.01); *H04W 72/20* (2023.01); *H04W 72/40* (2023.01); *H04W 72/563* (2023.01)

(58) Field of Classification Search
CPC ............ H04W 72/02; H04W 72/0446; H04W 72/1263; H04W 72/20; H04L 1/0003; H04L 1/1812; H04L 5/0051
See application file for complete search history.

(56) References Cited

U.S. PATENT DOCUMENTS

2020/0229171 A1 7/2020 Khoryaev et al.
2020/0229206 A1* 7/2020 Badic .................... H04W 40/24
(Continued)

OTHER PUBLICATIONS

OPPO, "Discussion on remaining open issues in mode 2," 3GPP TSG-RAN WG1 #101e, R1-2004074, May 15, 2020, 22 pages.
(Continued)

*Primary Examiner* — Chae S Lee
(74) *Attorney, Agent, or Firm* — LEE HONG DEGERMAN KANG & WAIMEY

(57) ABSTRACT

Provided are a method for performing wireless communication by a first device, and an apparatus for supporting same. The method may comprise: determining selectable candidate slots for sidelink (SL) transmission; determining N slots for sensing from a first slot among the selectable candidate slots, wherein the N slots are at least one slot for selecting at least one SL resource from among SL resources included in the selectable candidate slots; selecting the at least one SL resource based on the sensing for the N slots; and transmitting, to a second device through a physical sidelink shared channel (PSSCH), a medium access control protocol data unit (MAC PDU) based on the at least one SL resource, wherein a value of N is a positive integer.

20 Claims, 22 Drawing Sheets

(51) Int. Cl.
*H04L 1/1812* (2023.01)
*H04L 5/00* (2006.01)
*H04W 72/0446* (2023.01)
*H04W 72/1263* (2023.01)
*H04W 72/20* (2023.01)
*H04W 72/40* (2023.01)
*H04W 72/563* (2023.01)

(56) References Cited

U.S. PATENT DOCUMENTS

| | | | |
|---|---|---|---|
| 2021/0007081 A1* | 1/2021 | Shin | H04W 72/535 |
| 2021/0144681 A1* | 5/2021 | Gulati | H04W 24/08 |
| 2022/0386284 A1* | 12/2022 | Zhao | H04W 72/542 |
| 2023/0050353 A1* | 2/2023 | Miao | H04W 72/02 |
| 2023/0142670 A1* | 5/2023 | Mohammad Soleymani | H04W 72/02 370/329 |

OTHER PUBLICATIONS

3rd Generation Partnership Project (3GPP), 3rd Generation Partnership Project; "Technical Specification Group Radio Access Network; NR; Physical layer procedures for data (Release 16)," 3GPP TS.38.214 V16.2.0, Jul. 20, 2020, 165 pages.

Intel Corporation, "Remaining details of Mode-2 NR V2X sidelink design," 3GPP TSG-RAN WG1 #101e, R1-2003735, May 16, 2020, 13 pages.

Intel Corporation, "TPs based on outcome of [101-e-NR-5G_V2X_NRSL-Mode-2-04]," 3GPP TSG-RAN WG1 #101e, R1-2004945, Jun. 8, 2020, 11 pages.

PCT International Application No. PCT/KR2021/010499, International Search Report dated Nov. 8, 2021, 3 pages.

* cited by examiner (a)    (b)

(a)

(b)

(c)

US 11,864,161 B2

METHOD AND APPARATUS FOR POWER SAVING IN NR V2X

CROSS-REFERENCE TO RELATED APPLICATIONS

Pursuant to 35 U.S.C. § 119 (e), this application claims the benefit of U.S. Provisional Application Nos. 63/063,216, filed on Aug. 7, 2020, and 63/105,204, filed on Oct. 23, 2020, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

Meanwhile, in NR V2X, partial sensing or no sensing may be supported. Compared to full sensing, partial sensing or no sensing may obtain a power saving gain, but may cause resource collision between UEs. Accordingly, there is a need to propose a method for maximizing a power saving gain while minimizing resource collision and an apparatus supporting the same.

Technical Solutions

In one embodiment, provided is a method for performing wireless communication by a first device. The method may comprise: determining selectable candidate slots for sidelink (SL) transmission; determining N slots for sensing from a first slot among the selectable candidate slots, wherein the N slots are at least one slot for selecting at least one SL resource from among SL resources included in the selectable candidate slots; selecting the at least one SL resource based on the sensing for the N slots; and transmitting, to a second device through a physical sidelink shared channel (PSSCH), a medium access control protocol data unit (MAC PDU) based on the at least one SL resource, wherein a value of N is a positive integer.

In one embodiment, provided is a first device configured to perform wireless communication. The first device may comprise: one or more memories storing instructions; one or more transceivers; and one or more processors connected to the one or more memories and the one or more transceivers. The one or more processors may execute the instructions to: determine selectable candidate slots for sidelink (SL) transmission; determine N slots for sensing from a first slot among the selectable candidate slots, wherein the N slots are at least one slot for selecting at least one SL resource from among SL resources included in the selectable candidate slots; select the at least one SL resource based on the sensing for the N slots; and transmit, to a second device through a physical sidelink shared channel (PSSCH), a medium access control protocol data unit (MAC PDU) based on the at least one SL resource, wherein a value of N is a positive integer.

Effects of the Disclosure

The user equipment (UE) can efficiently perform SL communication.

DESCRIPTION OF EXEMPLARY EMBODIMENTS

Figure 1:
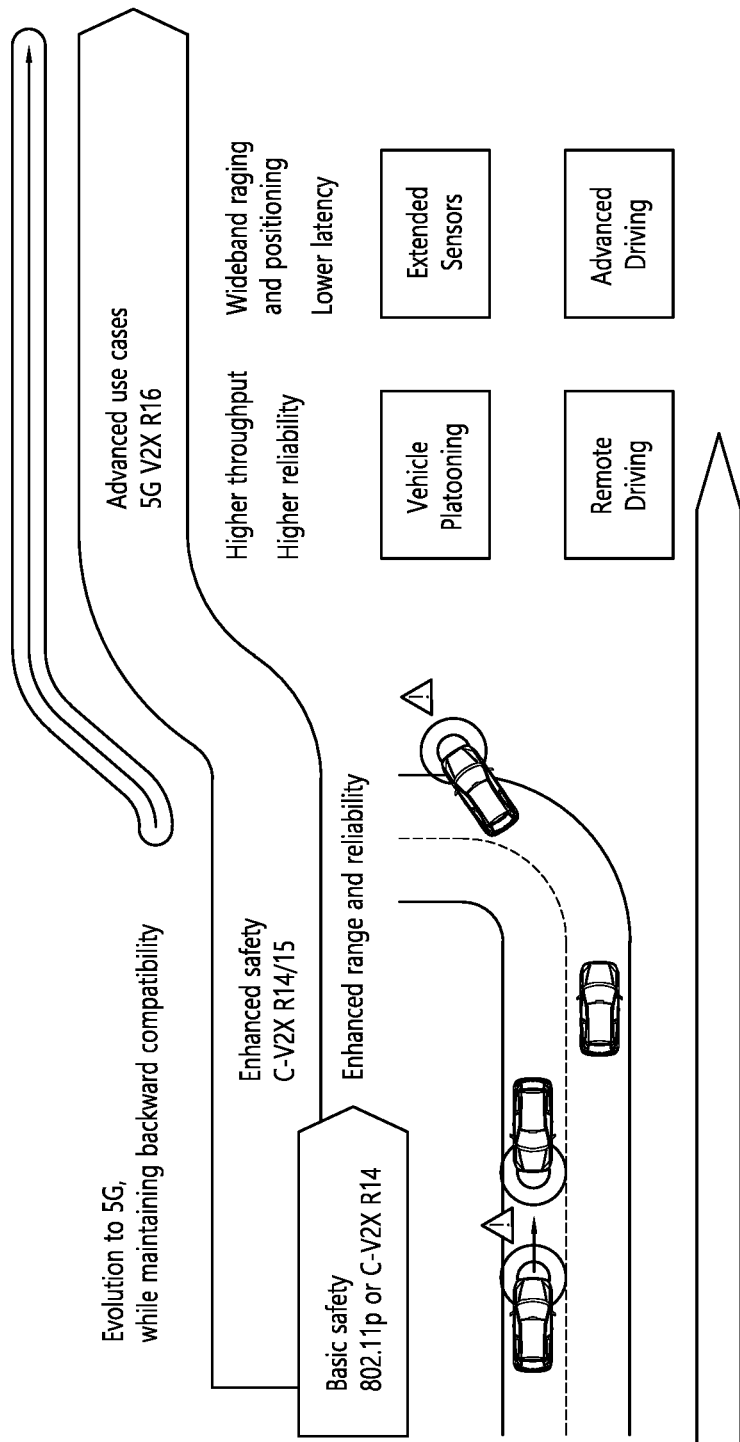
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
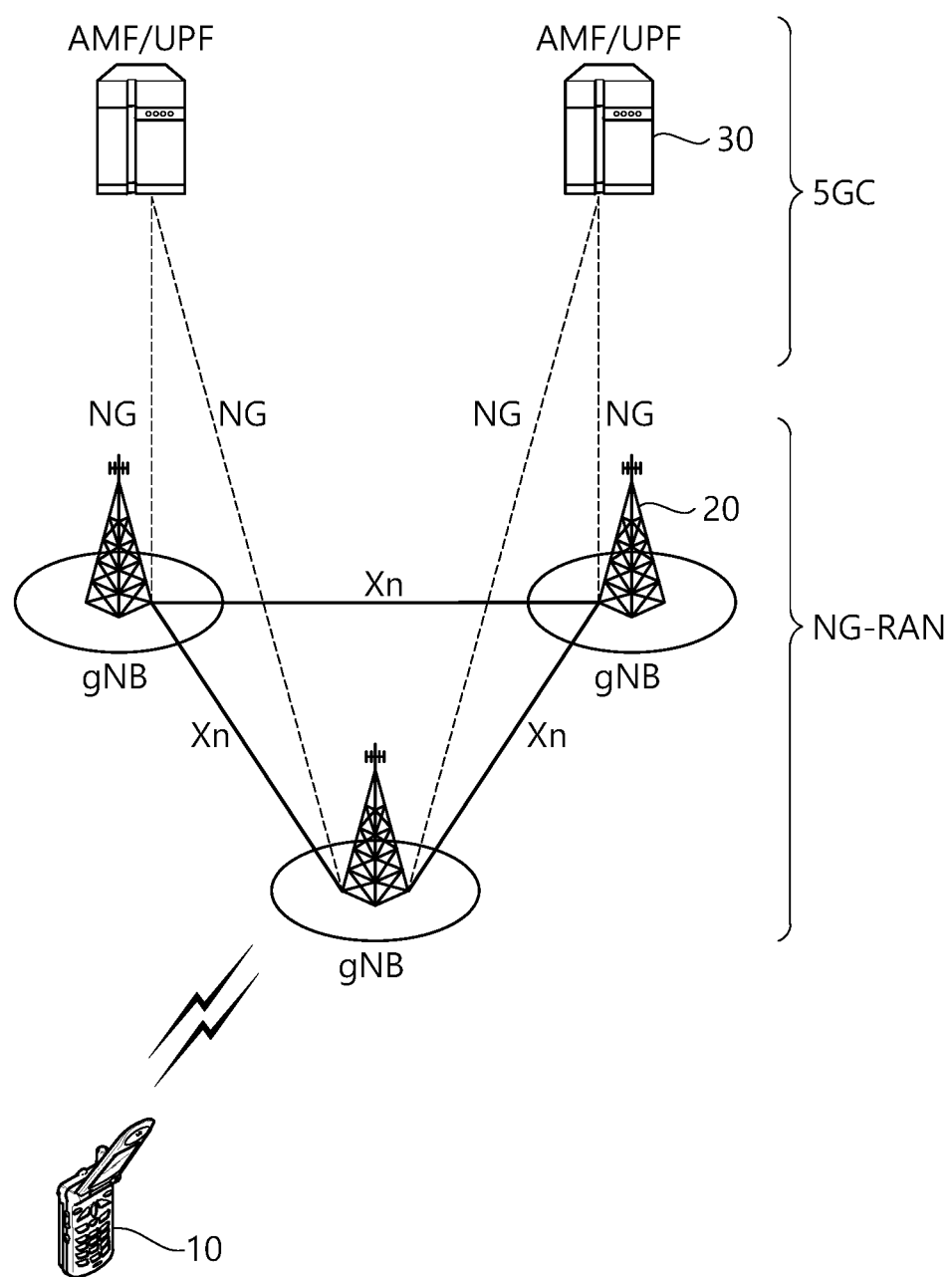
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
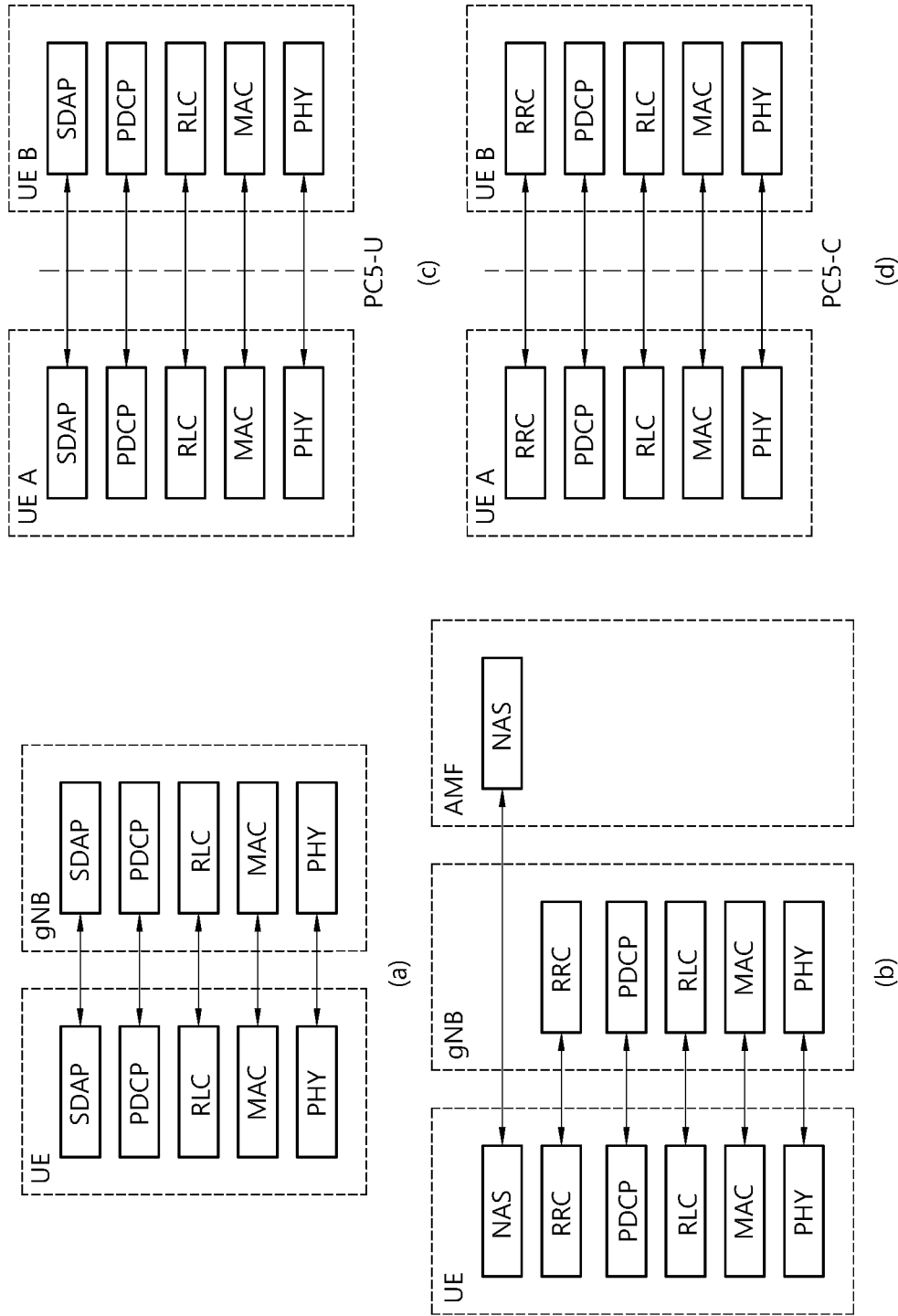
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
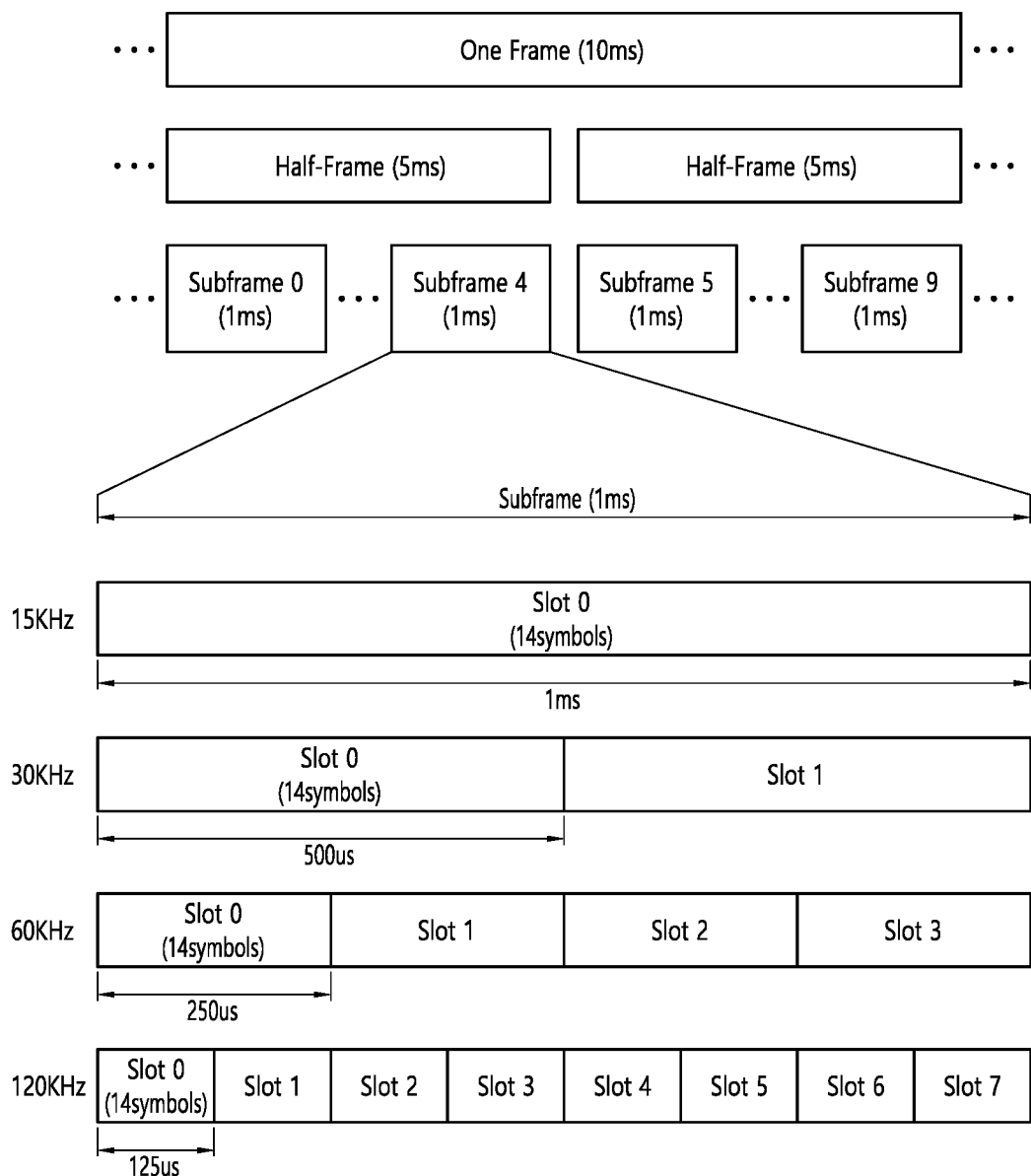
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
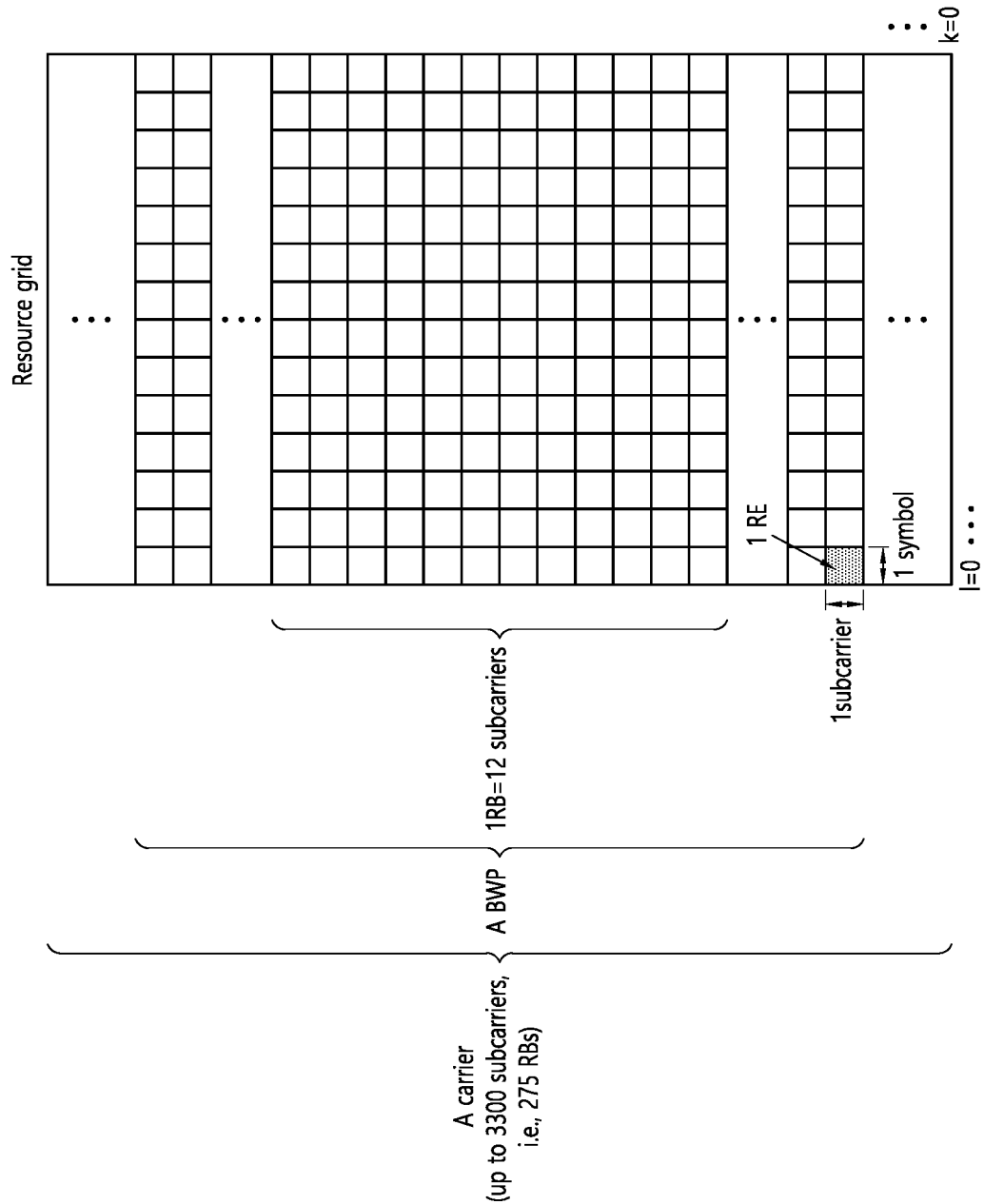
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
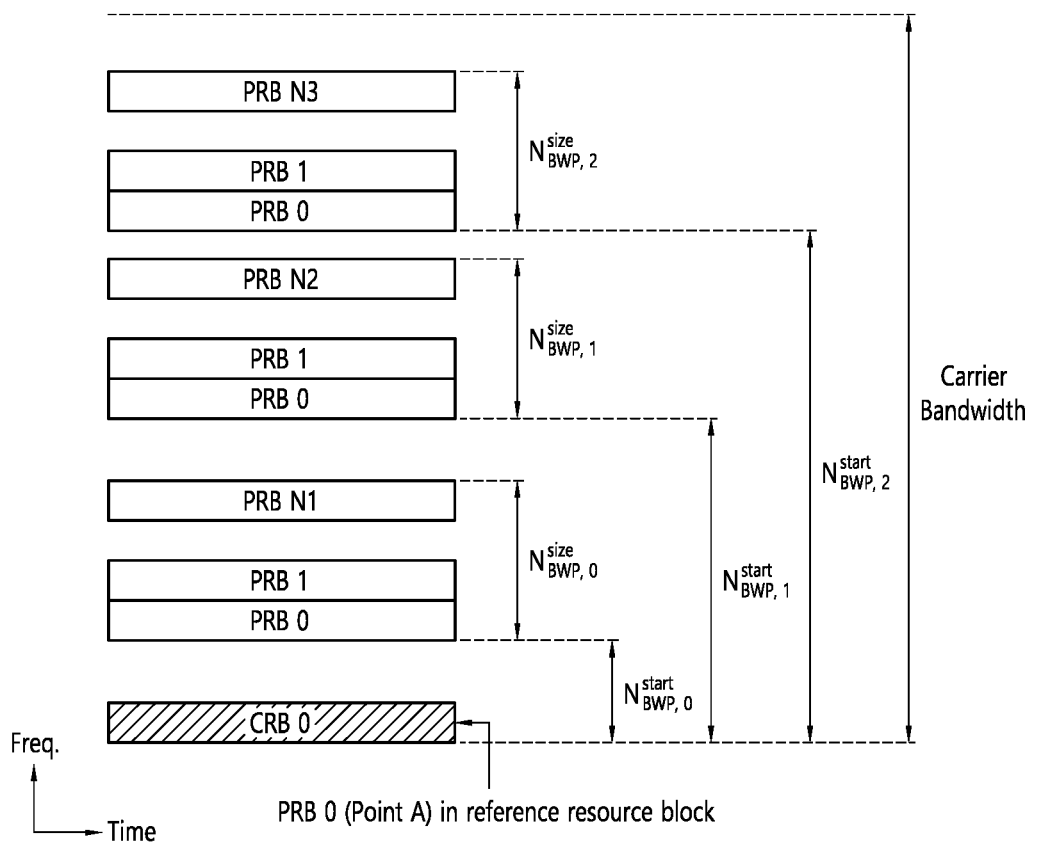
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
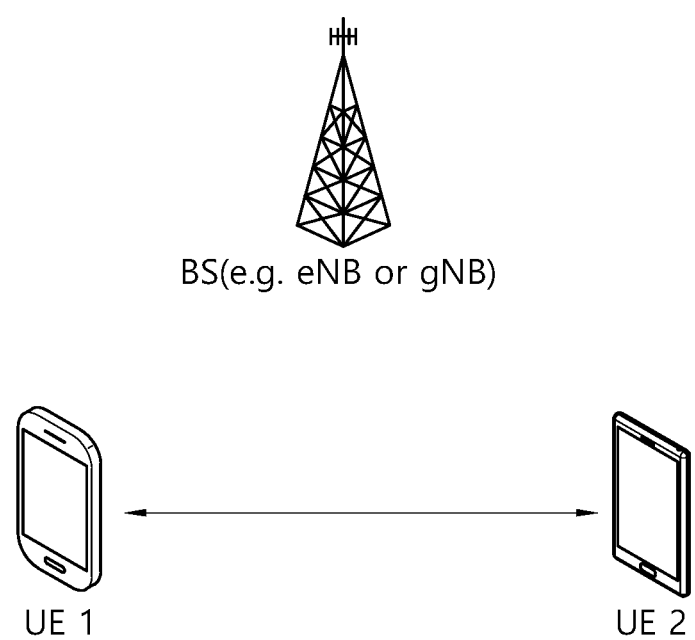
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
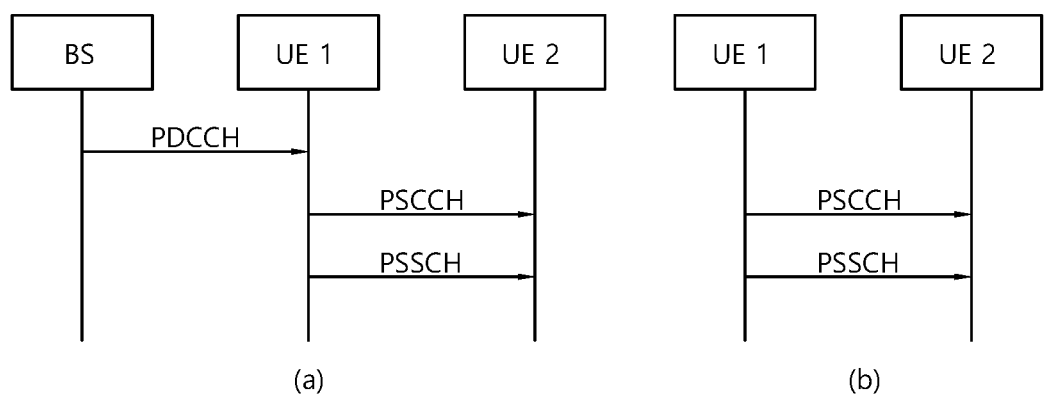
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at $T1 \geq 0$, and the resource selection window may be restricted by a remaining packet delay budget of the UE 2. For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a slot. For example, a size of a sub-channel may be configured for the UE or may be pre-configured.

Figure 9:
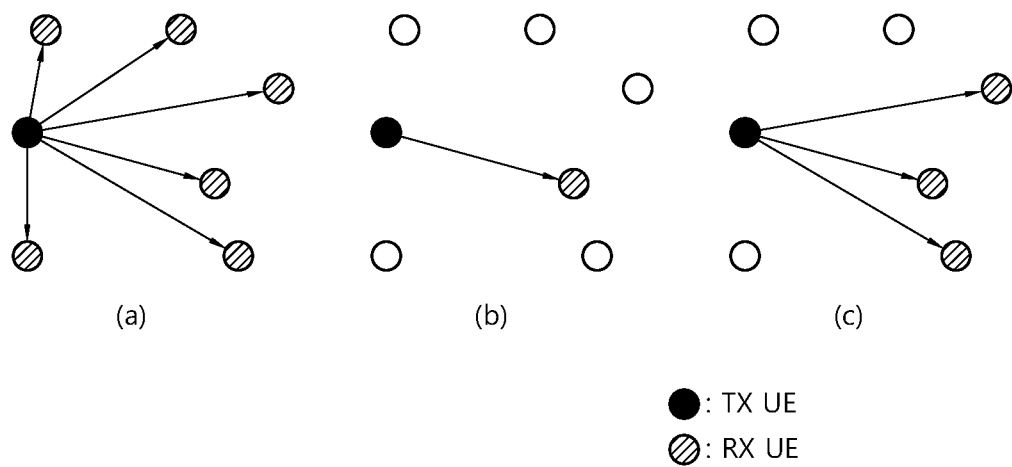
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
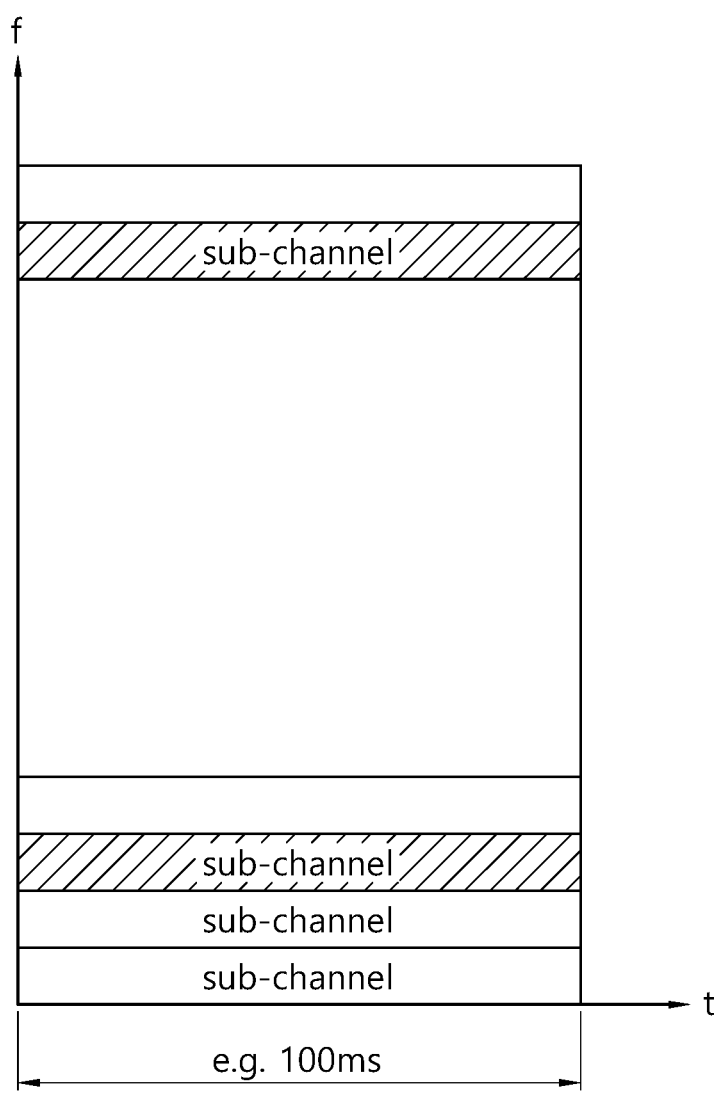
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. For example, the TX UE may be a UE which transmits SL CSI-RS(s) and/or a SL CSI report request indication to (target) RX UE(s). For example, the TX UE may be a UE which transmits a (pre-defined) reference signal(s) (e.g., PSSCH demodulation reference signal (DM-RS)) and/or SL (L1) RSRP report request indicator, which is/are used for SL (L1) RSRP measurement, to (target) to RX UE(s). For example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) operation(s) and/or SL radio link failure (RLF) operation(s) of (target) RX UE(s).

Meanwhile, in the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in the present disclosure, a TX UE may transmit the entirety or part of information described below to RX UE(s) through SCI(s). Herein, for example, the TX UE may transmit the entirety or part of the information described below to the RX UE(s) through a first SCI and/or a second SCI.

PSSCH (and/or PSCCH) related resource allocation information (e.g., the number/positions of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator)) (on a PSSCH)

Modulation and coding scheme (MCS) information

Transmit power information

L1 destination ID information and/or L1 source ID information

SL HARQ process ID information

New data indicator (NDI) information

Redundancy version (RV) information (Transmission traffic/packet related) QoS information (e.g., priority information)

SL CSI-RS transmission indicator or information on the number of (to-be-transmitted) SL CSI-RS antenna ports Location information of the TX UE or location (or distance region) information of target RX UE(s) (for which SL HARQ feedback is requested)

Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in the present disclosure, for example, a PSCCH may be replaced/substituted with at least one of a SCI, a first SCI ($1^{st}$-stage SCI), and/or a second SCI ($2^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa.

Meanwhile, in the present disclosure, for example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the $1^{st}$ SCI and the $2^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

Meanwhile, in the present disclosure, for example, "configuration" or "definition" may mean (pre-)configuration from base station(s) or network(s). For example, "configuration" or "definition" may mean resource pool specific (pre-)configuration from base station(s) or network(s). For example, base station(s) or network(s) may transmit information related to "configuration" or "definition" to UE(s). For example, base station(s) or network(s) may transmit information related to "configuration" or "definition" to UE(s) through pre-defined signaling. For example, the pre-defined signaling may include at least one of RRC signaling, MAC signaling, PHY signaling, and/or SIB.

Meanwhile, in the present disclosure, for example, "configuration" or "definition" may mean that it is designated or configured through pre-configured signaling between UEs. For example, information related to "configuration" or "definition" may be transmitted or received pre-configured signaling between UEs. For example, the pre-defined signaling may include at least one of RRC signaling, MAC signaling, PHY signaling, and/or SIB.

Meanwhile, in the present disclosure, for example, RLF may be replaced/substituted with out-of-synch (OOS) and/or in-synch (IS), or vice versa.

Meanwhile, in the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa. For example, the cast or the cast type may include unicast, groupcast and/or broadcast.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in the present disclosure, for example, for convenience of description, a (physical) channel used when a RX UE transmits at least one of the following information to a TX UE may be referred to as a PSFCH.

SL HARQ Feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in the present disclosure, a high priority may mean a small priority value, and a low priority may mean a large priority value. For example, Table 5 shows an example of priorities.

TABLE 5

| service or logical channel | priority value |
|---|---|
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 11:
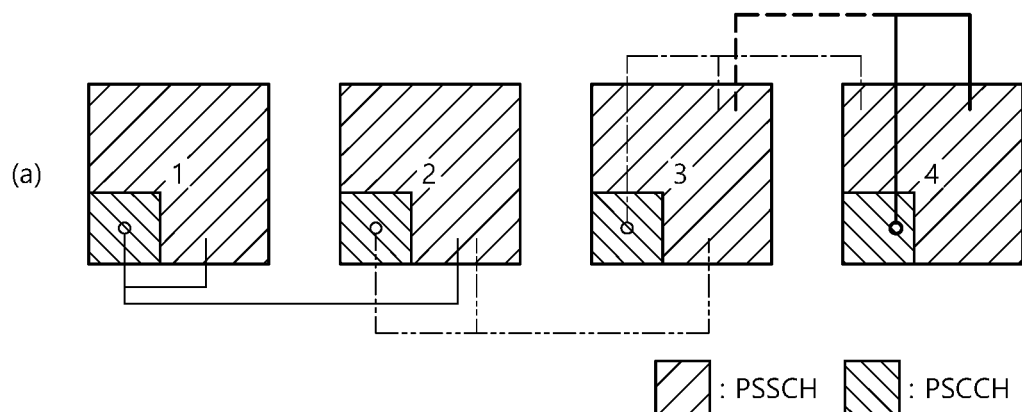
FIG. 11 shows a method in which a UE that has reserved transmission resource(s) informs another UE of the transmission resource(s), based on an embodiment of the present disclosure.
Figure 11:
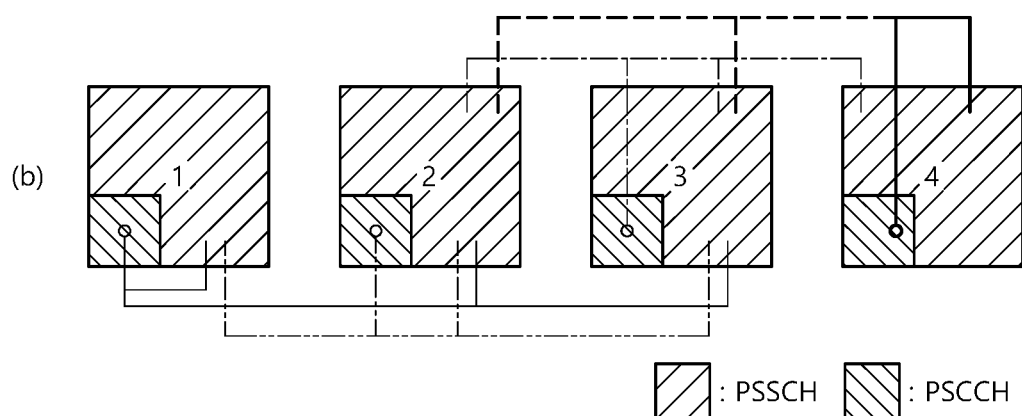
Figure 11:
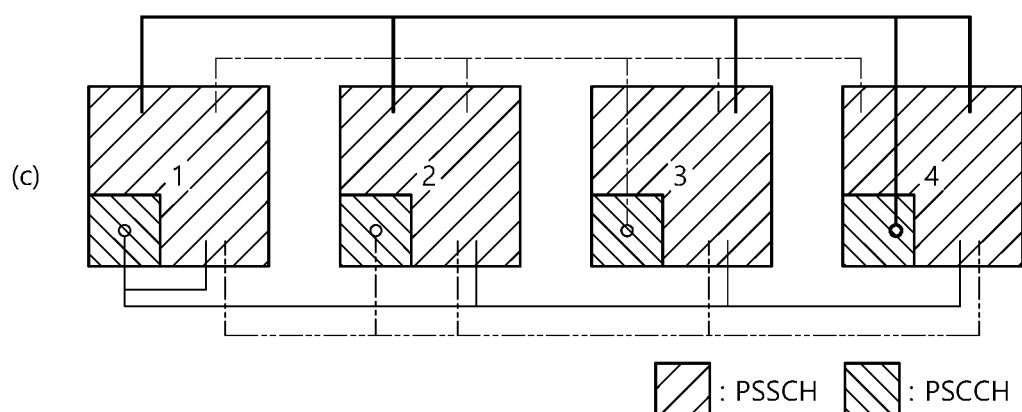

FIG. 11 shows a method in which a UE that has reserved transmission resource(s) informs another UE of the transmission resource(s), based on an embodiment of the present disclosure. The embodiment of FIG. 11 may be combined with various embodiments of the present disclosure.

Specifically, for example, (a) of FIG. 11 shows a method for performing by a transmitting UE chain-based resource reservation by transmitting/signaling location information of (maximum) 2 transmission resources to receiving UE(s) through one SCI, in the case of a value of K=4. For example, (b) of FIG. 11 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 11, the transmitting UE may transmit/signal only location information of the fourth transmission-related resource to the receiving UE(s) through the fourth (or last) transmission-related PSCCH. For example, referring to (a) of FIG. 11, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 11, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 11, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 11, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 11 shows a method for performing by the transmitting UE block-based resource reservation, by signaling location information of 4 transmission resources to receiving UE(s) through one SCI, in the case of a value of K=4.

In the present disclosure, for example, if a UE which has reserved a first resource removes the first resource and selects a second resource based on pre-emption or re-evaluation, the second resource may be referred to as a reselected resource.

In the present disclosure, for example, a P-UE may include a pedestrian UE, a device requiring power saving, a device which performs resource selection based on partial sensing, a device which performs resource selection based on random selection (i.e., no sensing), etc.

In the present disclosure, for example, a V-UE may include a vehicle, a device not requiring power saving, a device which performs resource selection based on full sensing, etc.

Based on an embodiment of the present disclosure, in the case of performing periodic resource reservation, on a resource domain PERIOD #X, a resource domain of the future period in which a pre-emption check operation is performed may be limited to a resource domain PERIOD #X+K. For example, a value of K may be fixed to 1. For example, a value of K may be a value pre-configured for a UE. Herein, for example, the rule may be limitedly applied only when a value of the period is greater than a value of a minimum processing time required for the pre-emption check operation. For example, the rule may be limitedly applied only when a value of the period is greater than or equal to a value of a minimum processing time required for the pre-emption check operation.

For example, in the case of performing periodic resource reservation, on a resource domain PERIOD #X, a resource domain of the future period in which the pre-emption check operation is performed may be limited to a resource domain of the future period after the minimum processing time required for the pre-emption check operation from the resource domain PERIOD #X. For example, in the case of performing periodic resource reservation, on a resource domain PERIOD #X, a resource domain of the future period in which the pre-emption check operation is performed may be limited to a resource domain of the future period (to which reserved resource(s) belongs) that appears first after the minimum processing time required for the pre-emption check operation from the resource domain PERIOD #X. For example, in the case of performing periodic resource reservation, on a resource domain PERIOD #X, a resource domain of the future period in which the pre-emption check operation is performed may be limited to a resource domain of the per-configured number of future periods (to which reserved resource(s) belongs) that appears first after the minimum processing time required for the pre-emption check operation from the resource domain PERIOD #X. For example, the pre-configured number may be 1.

Based on an embodiment of the present disclosure, in the case of performing periodic resource reservation, a UE may perform resource reselection based on pre-emption. For example, in this case, if the reselected resource cannot be reserved/signaled by a prior SCI, the UE may not signal/transmit a resource reservation period on a SCI related to the reselected resource. For example, the above-described operation may be interpreted as a type of one-shot transmission. On the other hand, for example, if the reselected resource can be reserved/signaled by a prior SCI, the UE may signal/transmit a resource reservation period on a SCI related to the reselected resource, and the UE may use the reselected resource periodically.

For example, if some of periodic reserved resources need to be reselected based on pre-emption, the UE may be configured to perform resource reselection for all related SL grants. For example, if some of periodic reserved resources need to be reselected based on pre-emption, the UE may clear all related SL grants and perform resource reselection.

Based on an embodiment of the present disclosure, in the case of performing periodic resource reservation, in order to secure many retransmission resources within one period, a UE may merge a plurality of periodic resource reservations and use it for one SL HARQ process. Herein, for example, all of a plurality of merged periodic resource reservations may be configured to have (or share) the same (or common) counter value related to resource reselection triggering and/or the number of resource reservation periods. Alternatively, for example, each of periodic resource reservations may have a counter value related to resource reselection triggering and/or the number of resource reservation periods, independently. In this case, for example, if resource reselection is triggered for (at least) one periodic resource reservation, resource reselection may be performed for all of the merged periodic resource reservations. Alternatively, for example, if resource reselection is triggered for (at least) one periodic resource reservation, resource reselection may be performed only for the corresponding periodic resource reservation.

Meanwhile, in the next-generation system, in order to save power consumption of a UE, the UE may omit a sensing operation or perform a simplified sensing operation. For example, the UE may select reserved resource(s) or candidate resource(s) for SL transmission without the sensing operation. For example, the UE may attempt SCI detection for some slots within a sensing window, and the UE may determine whether or not to include or exclude the indicated reserved resource in or from available resources based on sensing information (e.g., reserved resource) indicated by the detected SCI and a legacy RSRP. For example, the UE may implementally select slot(s) in which the SCI detection is attempted. For example, the slot(s) in which the SCI detection is attempted may be derived from reserved resource(s) or candidate resource(s) in which the UE will perform SL transmission. For example, the UE may derive/determine the location of slot(s) for detecting SCI(s) in a sensing window by assuming a value of a specific period for reserved resource(s) or candidate resource(s) on which SL transmission is to be performed.

For example, the UE may perform partial sensing, and the UE may select/reserve resource(s) based on the partial sensing. For example, compared to full sensing, partial sensing may be beneficial in terms of power saving. For example, in NR V2X, the full sensing procedure may be defined as shown in Table 6 and Table 7. For example, in NR V2X, the full sensing procedure for pre-emption or re-evaluation may be defined as shown in Table 6 to Table 8.

TABLE 6

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:
    the resource pool from which the resources are to be reported;
    L1 priority, $prio_{TX}$;
    the remaining packet delay budget;
    the number of sub-channels to be used for the PSSCH/PSCCH transmission in a slot, $L_{subCH}$;
    optionally, the resource reservation interval, $P_{rsvp\_TX}$, in units of msec.
    if the higher layer requests the UE to determine a subset of resources from which the higher layer will select resources for PSSCH/PSCCH transmission as part of re-evaluation or pre-emption procedure, TABLE 6-continued the higher layer provides a set of resources ($r_0$, $r_1$, $r_2$, ... ) which may be subject to re-evaluation and a set of resources ($r_0'$, $r_1'$, $r_2'$, ... ) which may be subject to pre-emption.
  it is up to UE implementation to determine the subset of resources as requested by higher layers before or after the slot $r_i'' - T_3$, where $r_i''$ is the slot with the smallest slot index among ($r_0$, $r_1$, $r_2$, ... ) and ($r_0'$, $r_1'$, $r_2'$, ... ), and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.
The following higher layer parameters affect this procedure:
  sl-SelectionWindowList: internal parameter $T_{2min}$ is set to the corresponding value from higher layer parameter sl-SelectionWindowList for the given value of $\text{prio}_{TX}$.
  sl-Thres-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j = \text{prio}_{TX}$.
  sl-RS-ForSensing selects if the UE uses the PSSCH-RSRP or PSCCH-RSRP measurement, as defined in clause 8.4.2.1.
  sl-ResourceReservePeriodList
  sl-SensingWindow: internal parameter $T_0$ is defined as the number of slots corresponding to sl-SensingWindow msec
  sl-TxPercentageList: internal parameter X for a given $\text{prio}_{TX}$ is defined as sl-TxPercentageList ($\text{prio}_{TX}$) converted from percentage to ratio
  sl-PreemptionEnable: if sl-PreemptionEnable is provided, and if it is not equal to 'enabled', internal parameter $\text{prio}_{pre}$ is set to the higher layer provided parameter sl-PreemptionEnable
The resource reservation interval, $P_{rsvp\_TX}$, if provided, is converted from units of msec to units of logical slots, resulting in $P_{rsvp\_TX}'$ according to clause 8.1.7.
Notation:
($t_0'^{SL}$, $t_1'^{SL}$, $t_2'^{SL}$, ... ) denotes the set of slots which belongs to the sidelink resource pool and is defined in Clause 8.

TABLE 7

The following steps are used:
1) A candidate single-slot resource for transmission $R_{x,y}$ is defined as a set of $L_{subCH}$ contiguous sub-channels with sub-channel $x + j$ in slot $t_y'^{SL}$ where $j = 0, \ldots, L_{subCH} - 1$. The UE shall assume that any set of $L_{subCH}$ contiguous sub-channels included in the corresponding resource pool within the time interval $[n + T_1, n + T_2]$ correspond to one candidate single-slot resource, where selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP:
if $T_{2min}$ is shorter than the remaining packet delay budget (in slots) then $T_2$ is up to UE implementation subject to. $T_{2min} \leq T_2 \leq$ remaining packet delay budget (in slots): otherwise $T_2$ is set to the remaining packet delay budget (in slots).
The total number of candidate single-slot resources is denoted by $M_{total}$.
2) The sensing window is defined by the range of slots $[n - T_0, n - T_{proc,0}^{SL})$ where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.
3) The internal parameter $Th(p_i, p_j)$ is set to the corresponding value of RSRP threshold indicated by the i-th field in sl-Thres-RSRP-List, where $i = p_i + (p_j - 1) * 8$.
4) The set $S_A$ is initialized to the set of all the candidate single-slot resources.
5) The UE shall exclude any candidate single-slot resource $R_{x,y}$ from the set $S_A$ if it meets all the following conditions:
the UE has not monitored slot $t_m'^{SL}$ in Step 2.
for any periodicity value allowed by the higher layer parameter sl-ResourceReservePeriodList and a hypothetical SCI format 1-A received in slot $t_m'^{SL}$ with 'Resource reservation period' field set to that periodicity value and indicating all subchannels of the resource pool in this slot condition c in step 6 would be met.
5a) If the number of candidate single-slot resources $R_{x,y}$ remaining in the set $S_A$ is smaller than $X \cdot M_{total}$, the set $S_A$ is initialized to the set of all the candidate single-slot resources as in step 4.
6) The UE shall exclude any candidate single-slot resource $R_{x,y}$ from the set $S_A$ if it meets all the following conditions:
a) the UE receives an SCI format 1-A in slot $t_m'^{SL}$, and 'Resource reservation period' field, if present, and 'Priority' field in the received SCI format 1-A indicate the values $P_{rsvp\_RX}$ and $\text{prio}_{RX}$, respectively according to Clause 16.4 in [6. TS 38.213];
b) the RSRP measurement performed, according to clause 8.4.2.1 for the received SCI format 1-A, is higher than $Th(\text{prio}_{RX}, \text{prio}_{TX})$;
c) the SCI format received in slot $t_m'^{SL}$ or the same SCI format which, if and only if the 'Resource reservation period' field is present in the received SCI format 1-A. is assumed to be received in slot(s) $t_{m+q \times P_{rsvp\_RX}'}^{'SL}$ determines according to clause 8.1.5 the set of resource blocks and slots which overlaps with $R_{x,y+j \times P_{rsvp\_TX}'}$ for $q = 1, 2, \ldots, Q$ and $j = 0, 1, \ldots, G_{resel} - 1$. Here, $P_{rsvp\_RX}'$ is $P_{rsvp\_RX}$ converted to units of logical slots according to clause 8.1.7, $$Q = \left\lceil \frac{T_{scal}}{P_{rsvp\_RX}'} \right\rceil$$

$P_{rsvp\_RX} < T_{scal}$ and $n' - m \leq P_{rsvp\_RX}'$, where $t_{n'}^{'SL} = n$ if slot n belongs to the set ($t_0'^{SL}$, $t_1'^{SL}$, ..., $t_{v_{max}-1}'^{SL}$), otherwise slot $t_{n'}^{'SL}$ is the first slot after slot n belonging to the set ($t_0'^{SL}$, $t_1'^{SL}$, ..., $t_{v_{max}-1}'^{SL}$); otherwise $Q = 1$. $T_{scal}$ is set to selection window size $T_2$ converted to

TABLE 7-continued units of msec.
7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.
The UE shall report set $S_A$ to higher layers.

TABLE 8

If a resource $r_i$, from the set $(r_0, r_1, r_2, \ldots)$ is not a member of $S_A$,
then the UE shall report re-evaluation of the resource $r_i$ to higher layers.
If a resource $r_i'$ from the set $(r_0', r_1', r_2', \ldots)$ meets the conditions below
then the UE shall report pre-emption of the resource $r_i'$, to higher layers
   $r_i'$ is not a member of $S_A$, and
   $r_i'$ meets the conditions for exclusion in step 6, with
   $Th(prio_{RX}, prio_{TX},)$ set to the final threshold
   after executing steps 1)-7), i.e. including all necessary increments
   for reaching $X \cdot M_{total}$, and
   the associated priority $prio_{RX}$, satisfies one of the following
   conditions:
      sl-PreemptionEnable is provided and is equal to 'enabled' and
      $prio_{TX} > prio_{RX}$
      sl-PreemptionEnable is provided and is not equal to 'enabled',
      and $prio_{RX} < prio_{pre}$ and $prio_{TX} > prio_{RX}$ For example, in LTE V2X, the partial sensing procedure may be defined as shown in Table 9.

Based on an embodiment of the present disclosure, in order to maximally prevent collision with other UEs (e.g., UEs performing full sensing) coexisting on the same pool, a value of Y value (e.g., minimum number) for a selection window related to partial sensing may be configured differently based on a priority of transmission packet(s), an interference level of a resource pool, whether or not vehicle-UE (V-UE) exists, etc. For example, a value of Y value (e.g., minimum number), which is the number of slots for the candidate resource(s), may be configured differently based on a priority of transmission packet(s), an interference level of a resource pool, whether or not vehicle-UE (V-UE) exists, etc.

For example, in Equation (e.g., n−100*k) used to determine the number/location (e.g., minimum number) of sensing subframes/slots related to a specific subframe/slot within a set of Y subframes/slots, a value of k may be limited to a

TABLE 9

If partial sensiog is configured by higher layers then the following steps are used:
1) A candidate single-subframe resource for PSSCH transmission $R_{x,y}$ is defined as a set of $L_{subCH}$ contiguous sub-channels with sub-channel $x + j$ in subframe $t_y^{SL}$ where $j = 0, \ldots, L_{subCH} − 1$. The UE shall determine by its implementation a set of subframes which consists of at least Y subframes within the time interval $[n + T_1, n + T_2]$ where selections of $T_1$ and $T_2$ are up to UE implementations under $T_1 \leq 4$ and $T_{2min} (prio_{TX}) \leq T_2 \leq 100$, if $T_{2min} (prio_{TX})$ is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total mimber of the candidate single-subframe resources is denoted by $M_{total}$.
2) If a subframe $t_y^{SL}$ is included in the set of subframes in Step 1, the UE shall monitor any subframe $t_{y-k \times P_{stop}}^{SL}$ if k-th bit of the high layer parameter gapCandidateSensing is set to 1. The UE shall perform the behaviour in the following steps based on PSCCH decoded and S-RSSI measured in these subframes.
3) The parameter $Th_{a,b}$ is set to the value indicated by the i-th SL-ThresPSSCHI-RSRP field in SL-ThresPSSCH-RSRP-List where $i = a * 8 + b + 1$.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
PSSCH-RSRP measurement according to the received SCI format 1 is higher than $Th_{prio_{TX},prio_{RX}}$.
the SCI format received in subframe $t_m^{SL}$ or the same SCI format 1 which is assumed to be received in subframe(s) $t_{m+q \times P_{rsvp} \times P_{rsvp\_RX}}^{SL}$ determines according to 14.1. 1.4C the set of resource blocks and subframes which overlaps with $R_{x,y+j \times P_{rsvp\_RX}}'$ for $q = 1, 2, \ldots, Q$ and $j = 0, 1, \ldots, C_{resel} − 1$. Here, $$Q = \frac{1}{P_{rsvp\_RX}} \text{ if } P_{rsvp\_RX} < 1 \text{ and } y' − m \leq P_{step} \times P_{rsvp\_RX} + P_{step},$$

where $t_y^{SL}$ is the last subframe of the Y subframes, and Q = 1 otherwise.
6) If the number of candidate single-subframe resources remaining in the set $S_A$ is smaller than $0.2 \cdot M_{total}$, then Step 4 is repeated with $Th_{a,b}$ increased by 3 dB.
7) For a candidate single-subframe resource $R_{x,y}$ remaining in the set $S_A$, the metric $E_{x,y}$ is defined as the linear average of S-RSSI measured in sub-channels $x + k$ for $k = 0, \ldots, L_{subCH} − 1$ in the monitored subframes in Step 2 that can be expressed by $t_{y−P_{stop}*j}^{SL}$ for a non-negative integer j.
8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
The UE shall report set $S_B$ to higher layers.

value of the maximum resource reservation period allowed for a resource pool. Specifically, for example, since a UE does not perform RSSI-based sensing, the value k may be limited to the value of the maximum resource reservation period allowed for the resource pool. For example, a UE may determine sensing subframe(s)/slot(s) related to a specific subframe/slot within a set of Y subframes/slots based on value(s) of resource reservation period(s) allowed for a resource pool. In the present disclosure, for example, the set of Y subframes/slots may be a set of subframes/slots including at least Y candidate subframes/slots. For example, the set of Y subframes/slots may be a set of subframes/slots including at least Y candidate subframes/slots in a selection window.

Figure 12:
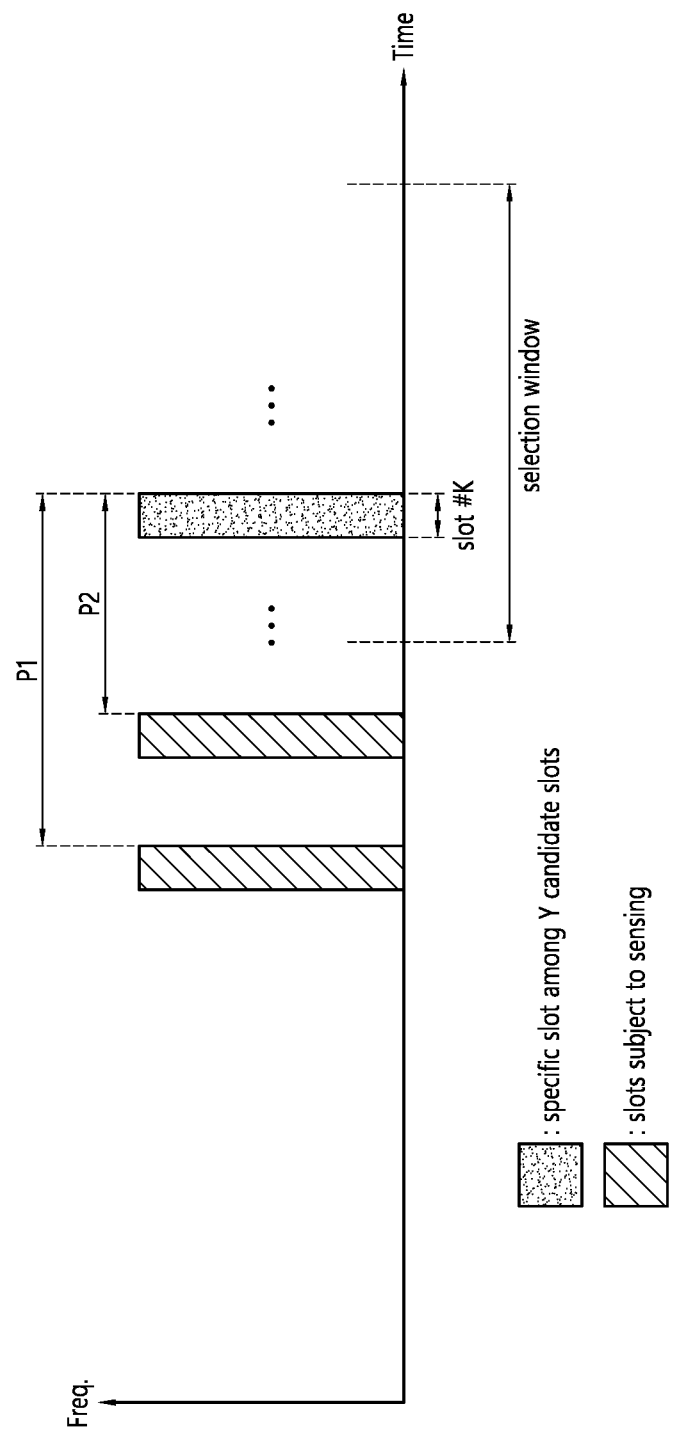
FIGS. 12 and 13 show a method for a UE to determine slot(s) for sensing based on resource reservation period(s) allowed for a resource pool, based on an embodiment of the present disclosure.
Figure 13:
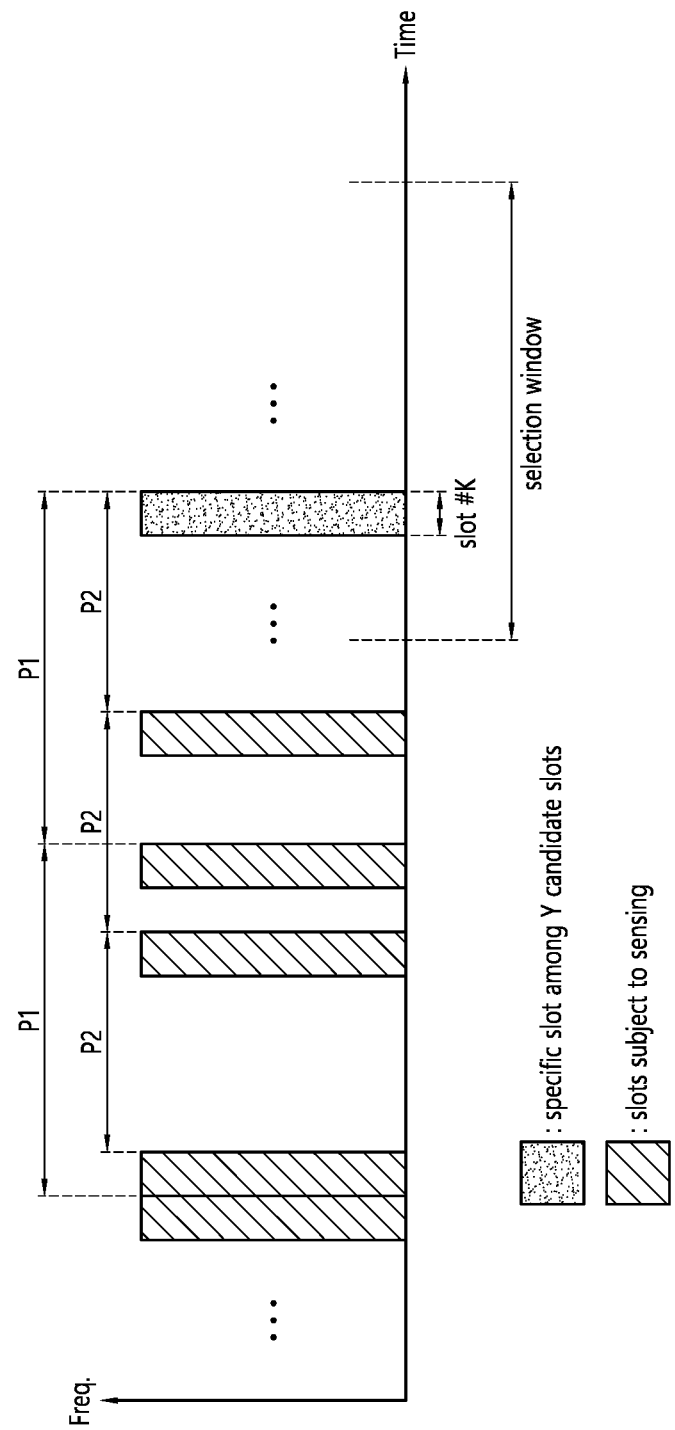

FIGS. 12 and 13 show a method for a UE to determine slot(s) for sensing based on resource reservation period(s) allowed for a resource pool, based on an embodiment of the present disclosure. The embodiments of FIGS. 12 and 13 may be combined with various embodiments of the present disclosure.

In the embodiments of FIGS. 12 and 13, it is assumed that resource reservation periods allowed for a resource pool are P1 and P2. Furthermore, it is assumed that the UE performs partial sensing for selecting a slot #K.

Referring to FIG. 12, the UE may perform sensing for a slot located before P1 from the slot #K and a slot located before P2 from the slot #K.

Referring to FIG. 13, the UE may perform sensing for a slot located before P1 from the slot #K and a slot located before P2 from the slot #K. Furthermore, optionally, the UE may perform sensing for a slot located before A*P1 from the slot #K and a slot located before B*P2 from the slot #K. For example, A and B may be positive integers greater than or equal to 2.

For example, in Equation (e.g., n−100*k) used to determine the number/location (e.g., minimum number) of sensing subframes/slots related to a specific subframe/slot within a set of Y subframes/slots, the constant 100 may be configured/set as/to a different value. For example, in Equation (e.g., n−100*k) used to determine the number/location (e.g., minimum number) of sensing subframes/slots related to a specific subframe/slot within a set of Y subframes/slots, the constant 100 may be configured/set as/to a different value for each transmission packet of a P-UE, an interference level, etc. For example, in Equation (e.g., n−100*k) used to determine the number/location (e.g., minimum number) of sensing subframes/slots related to a specific subframe/slot within a set of Y subframes/slots, the constant 100 may be configured/set as/to value(s) of resource reservation period(s) allowed for a resource pool.

For example, if the UE selects a set of Y subframes/slots, the UE may select the set of Y subframes/slots as much as possible so that reservation is possible through a prior SCI.

For example, a value of Y may be configured differently for the UE based on a retransmission requirement and/or a service requirement.

For example, the UE may select Y subframes/slots in order to be able to be reserved through a prior SCI.

For example, if subframes/slots as many as the required number of retransmissions are not supported based on a value of Y, the UE may not apply/perform a partial sensing operation.

For example, if periodic resource reservation is not allowed for a resource pool, the UE may not perform sensing based on Equation (e.g., n−100*k). For example, the UE may perform sensing for the pre-configured number of slots from the first slot of a selection window. For example, the UE may sense only up to 32 slots before from N-th subframe/slot.

Figure 14:
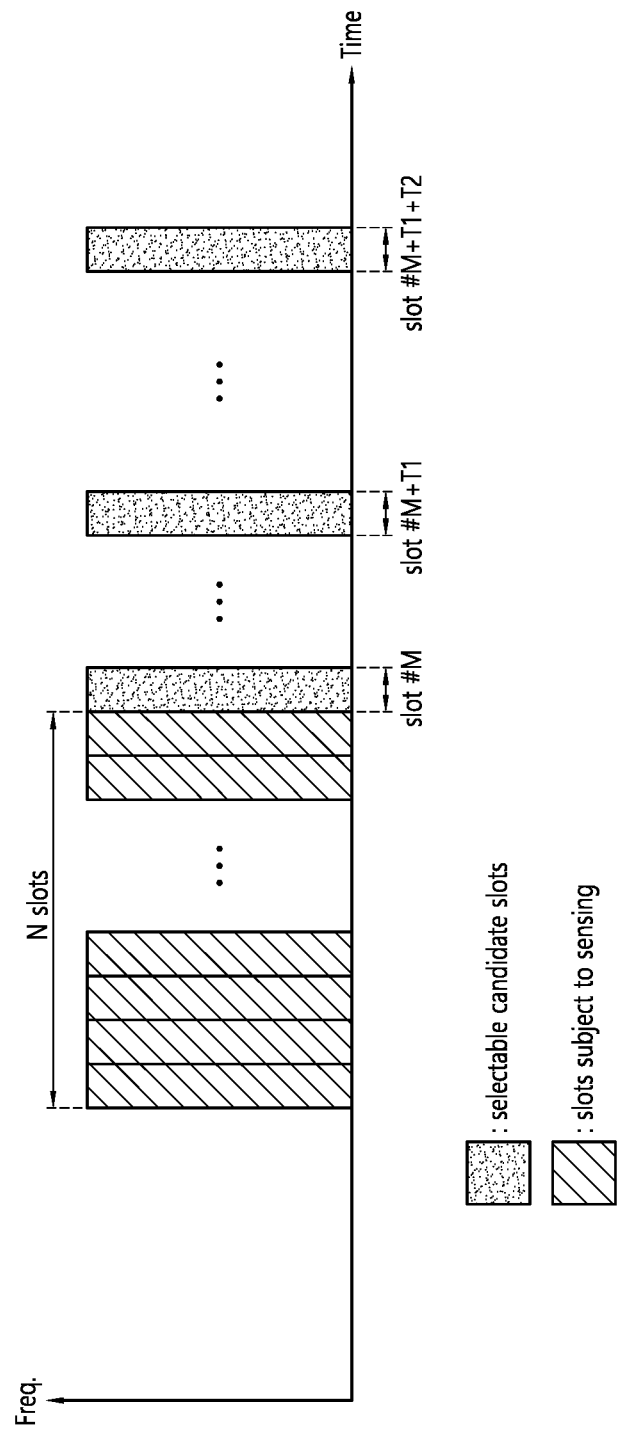
FIG. 14 shows a method for a UE to sense N slots based on the first slot among selectable candidate slots, based on an embodiment of the present disclosure.

FIG. 14 shows a method for a UE to sense N slots based on the first slot among selectable candidate slots, based on an embodiment of the present disclosure. The embodiment of FIG. 14 may be combined with various embodiments of the present disclosure.

In the embodiment of FIG. 14, it is assumed that candidate slots selectable by the UE are a slot #M, a slot #(M+T1), and a slot #(M+T1+T2). In this case, slot(s) in which the UE needs to perform sensing may be determined based on the first slot (i.e., slot #M) among selectable candidate slots. For example, after determining the first slot from among selectable candidate slots as a reference slot, the UE may perform sensing for (previous) N slots from the reference slot.

Referring to FIG. 14, based on the first slot (i.e., slot #M) among selectable candidate slots, the UE may perform sensing for N slots. For example, the UE may perform sensing for N slots before the slot #M, and the UE may select at least one SL resource from among selectable candidate slots (i.e., slot #M, slot #(M+T1), and slot #(M+T1+T2)) based on a result of the sensing. For example, N may be configured or pre-configured for the UE. For example, a time gap for processing may exist between the last slot and the slot #M among the N slots.

Based on an embodiment of the present disclosure, a mechanism for additionally protecting transmission of a P-UE compared to LTE may be introduced. For example, for power saving, the mechanism for additionally protecting transmission of the P-UE may be introduced.

For example, information indicating/representing a P-UE (e.g., a P-UE indicator) may be included in a SCI. For example, the P-UE may transmit the SCI including information indicating/representing the P-UE. In this case, for example, other pre-configured RSRP threshold (e.g., step 7 in Table 7) may be applied to transmission of the P-UE. For example, if the UE performs the pre-emption operation or the re-evaluation operation, other pre-configured RSRP threshold (e.g., step 7 in Table 7) may be applied to transmission of the P-UE. For example, if the UE performs the pre-emption operation, a priority threshold for transmission of the P-UE (e.g., a priority threshold in Table 8) may be configured differently.

For example, an RSRP threshold, a pre-emption priority, etc., applied in a pool in which random sensing/partial sensing is allowed may be configured differently. For example, compared to a pool in which random sensing/partial sensing is not allowed, an RSRP threshold, a pre-emption priority, etc., applied in a pool in which random sensing/partial sensing is allowed may be configured differently.

For example, based on a format of a second SCI, PSCCH scrambling/PSCCH DMRS sequence initialization, an ID on a SCI, etc., whether the UE is a P-UE or not may be distinguished. For example, for interference randomization, it is necessary to determine whether or not to separately initialize a PSSCH/second SCI scrambling or a DMRS. For example, for interference randomization, PSSCH/second SCI scrambling or a DMRS may be separately initialized.

For example, if the P-UE transmits a SCI including a priority value, it may be configured to apply a pre-configured offset to the priority value. For example, a UE which has received the SCI may apply the pre-configured offset to the priority value, and the UE may perform the pre-emption operation based on the priority value to which the offset is applied.

Based on an embodiment of the present disclosure, whether a UE performing partial sensing performs the pre-emption operation/re-evaluation operation or not may be configured. For example, since the pre-emption operation/re-evaluation operation may increase power consumption of the UE, the pre-emption operation/re-evaluation operation may not be allowed for the UE performing partial sensing.

For example, a UE performing partial sensing may perform the pre-emption operation/re-evaluation operation. In this case, compared with a UE (e.g., V-UE) performing full sensing, timeline related to the pre-emption operation/re-evaluation operation by the UE performing partial sensing is loose (e.g., frequency or time period taking into account detected SCI(s)). For example, compared to a UE (e.g., V-UE) performing full sensing, a sensing window related to the pre-emption operation/re-evaluation operation by a UE performing partial sensing may be short.

For example, whether or not to apply the pre-emption operation/re-evaluation operation may be configured differently based on a type of a UE.

For example, the lower bound of a period value to which a counter scaling factor/scaling of a P-UE is applied may be configured differently from that of a V-UE. For example, based on whether partial sensing or random selection is performed, the lower bound of the period value to which the counter scaling factor/scaling is applied may be configured differently.

For example, in a resource pool for only P-UE or only random selection (and/or only partial sensing), the pre-emption operation/re-evaluation operation may not be allowed.

Based on an embodiment of the present disclosure, if a resource pool in which both partial sensing and random selection is allowed is configured for the UE, and if the UE has a partial sensing capability, and if the UE is not instructed to use either one of partial sensing or random selection, the UE may select either partial sensing or random selection.

For example, if an interference level is high, the UE may select partial sensing, and the UE may select resource(s) for SL transmission based on partial sensing. For example, if an interference level of a resource pool is high, the UE may select partial sensing, and the UE may select resource(s) for SL transmission based on partial sensing.

For example, if a priority of packet transmission of the UE is relatively low, the UE may select partial sensing, and the UE may select resource(s) for SL transmission based on partial sensing. For example, if a priority value related to packet transmission of the UE is greater than a threshold value, and/or if a priority value related to packet transmission of the UE is greater than a priority value related to packet transmission of another UE, the UE may select partial sensing, and the UE may select resource(s) for SL transmission based on partial sensing.

For example, if a priority of packet transmission of the UE is relatively high, the UE may select partial sensing, and the UE may select resource(s) for SL transmission based on partial sensing. For example, if a priority value related to packet transmission of the UE is less than a threshold value, and/or if a priority value related to packet transmission of the UE is less than a priority value related to packet transmission of another UE, the UE may select partial sensing, and the UE may select resource(s) for SL transmission based on partial sensing.

For example, if the remaining battery amount of the UE is sufficient, the UE may select partial sensing, and the UE may select resource(s) for SL transmission based on partial sensing. For example, if the remaining battery amount of the UE is equal to or greater than a threshold value, the UE may select partial sensing, and the UE may select resource(s) for SL transmission based on partial sensing. For example, the UE may be a UE with RX capability.

For example, if the above-described condition is not satisfied, the UE may fallback to random selection. For example, if the above-described condition is not satisfied, the UE may select random selection, and the UE may select resource(s) for SL transmission based on random selection.

For example, the above-described disclosure may be interpreted as the UE selecting a different resource selection scheme according to a priority of service(s).

For example, re-evaluation may be applied only to high-priority packet transmission, and pre-emption may be applied only to low-priority packet transmission.

Based on an embodiment of the present disclosure, if a P-UE cannot receive a PSCCH/PSSCH, a procedure defined for a V-UE may be reused based on a (pre-)configured CBR value.

For example, a CBR measurement window/CR evaluation window of the P-UE may be configured differently from that of the V-UE. For example, the P-UE may calculate/obtain a CBR value based only an RSSI value measured in sensing subframe(s)/slot(s) in a sensing window determined by a Y set. For example, subframe(s)/slot(s) in the sensing window in which sensing is not performed may be counted as busy. For example, the Y set may be a set of subframes/slots including at least Y candidate subframes/slots. For example, the Y set may be a set of subframes/slots including at least Y candidate subframes/slots in a selection window.

For example, an RSSI threshold or a congestion level-based physical layer parameter value for determining busy may be separately configured for the P-UE.

For example, a CBR measurement window and/or a CR evaluation window may be (pre-)configured differently for each UE type.

Based on an embodiment of the present disclosure, if the UE switches between a plurality of resource pools, a method of processing an obtained/calculated CBR value and/or an obtained/calculated CR value is proposed. For example, the obtained/calculated CBR value and/or the obtained/calculated CR value may be reset. For example, after the UE obtains the CBR value and/or the CR value for a first resource pool, if the UE switches from the first resource pool to a second resource pool, the UE may reset the CBR value and/or the CR value obtained for the first resource pool.

Based on an embodiment of the present disclosure, a value of X for each priority (e.g., a value of X in step 7 in Table 7) may be separately configured for a P-UE. For example, a value of X for each priority for the P-UE may be configured separately from a value of X for each priority for a V-UE.

For example, a value of T2 min for each priority (e.g., a value of T2 min in step 1 in Table 7) may be separately configured for the P-UE. For example, a value of T2 min for each priority for the P-UE may be configured separately from a value of T2 min for each priority for the V-UE.

For example, exceptionally, a restriction for RSRP threshold boosting in order to satisfy X % (e.g., step 7 in Table 7) may be configured for the P-UE.

For example, a value of a sensing window may be configured for the P-UE differently from the V-UE. For example, a value of a sensing window may be separately configured for the P-UE.

Meanwhile, in consideration of complexity, power consumption, etc., it is necessary to determine whether or not to limit a transmission scheme (e.g., rank-2, MCS table) for the P-UE. In addition, according to LTE V2X, a UE performing random selection/partial sensing does not perform SLSS/PSBCH transmission. Meanwhile, in NR V2X, it is necessary to determine whether or not to allow a UE performing random selection/partial sensing to perform SLSS/PSBCH transmission. In addition, similar to LTE V2X, it is necessary to determine whether or not to set a lower bound value (e.g., 100 ms) for selectable resource reservation period(s).

For example, the UE may perform SLSS/PSBCH transmission only when actually performing packet transmission. For example, like D2D discovery, the UE may perform SLSS/PSBCH transmission only when actually performing packet transmission.

For example, the UE may perform SLSS/PSBCH transmission based on a period longer than 160 ms. For example, even if resources for SLSS/PSBCH transmission are the same as before, the UE may perform SLSS/PSBCH transmission based on a period longer than 160 ms.

For example, if the P-UE transmits the SLSS/PSBCH, the SLSS/PSBCH may be considered as a relatively high priority. For example, a priority of the SLSS/PSBCH transmitted by the P-UE may be higher than a priority of the SLSS/PSBCH transmitted by the V-UE. For example, since a priority of the SLSS/PSBCH transmitted by the P-UE is relatively high, neighboring UEs receiving the SLSS/PSBCH may create a synch cluster based on the SLSS/PSBCH.

Based on an embodiment of the present disclosure, beta candidate value(s) and/or alpha value(s) related to a second SCI for a P-UE may be configured differently from that of a V-UE. For example, separately from beta candidate value(s) and/or alpha value(s) related to the second SCI for the V-UE, beta candidate value(s) and/or alpha value(s) related to the second SCI may be configured for the P-UE. For example, additionally, based on whether partial sensing or random selection is performed, the corresponding parameter candidate value(s) may be configured differently.

For example, DMRS pattern candidate(s) or MCS table candidate(s) for the P-UE may be configured differently from the V-UE. For example, DMRS pattern candidate(s) or MCS table candidate(s) for the P-UE may be configured for the P-UE separately from DMRS pattern candidate(s) or MCS table candidate(s) for the V-UE. For example, additionally, based on whether partial sensing or random selection is performed, the corresponding parameter candidate(s) may be configured differently.

Based on an embodiment of the present disclosure, it is necessary to determine whether or not to allow enabling of HARQ feedback for packet transmission based on random selection or partial sensing.

For example, packet transmission based on random selection or partial sensing may cause a lot of interference to UE(s) performing full sensing-based transmission on the same resource pool. Due to this, retransmissions may increase. Therefore, for example, a set of RBs of PSFCH resources may be configured separately.

For example, if a UE performing transmission based on random selection or partial sensing transmits a HARQ feedback enabled MAC PDU, the UE may use pre-configured separate resource(s).

For example, only if partial sensing is allowed for a resource pool and randomly selected resource(s) is reserved, the UE may be allowed to transmit a HARQ feedback enabled MAC PDU based on the randomly selected resource(s). Alternatively, for example, if partial sensing is allowed for a resource pool and randomly selected resource(s) is reserved, the UE may not be allowed to transmit a HARQ feedback enabled MAC PDU based on randomly selected resource(s).

For example, if ACK/NACK is supported, a value of K (e.g., PSSCH-to-PSFCH value) may be configured. For example, if clock speed is lowered, power consumption may be reduced. In this case, a larger value of K (e.g., PSSCH-to-PSFCH value) may be required instead.

For example, a value of a zone length/width for each communication range may be separately configured for a P-UE. For example, separately from a value of a zone length/width for each communication range for a V-UE, a value of a zone length/width for each communication range for the P-UE may be configured for the P-UE.

Based on an embodiment of the present disclosure, it is necessary to determine whether or not to allow SL pathloss-based power control for a P-UE. For example, if the P-UE does not have RX capability, the P-UE may not be able to perform SL pathloss-based power control. For example, if the P-UE has partial RX capability, it may be inefficient for the P-UE to perform SL pathloss-based power control due to RSRP accuracy problems. For example, if the P-UE has partial RX capability, the P-UE may perform SL pathloss-based power control.

For example, nominal power of the P-UE may be configured to be different from that of the V-UE. For example, nominal power of the P-UE may be configured to be the same as that of the V-UE.

For example, the maximum power of the P-UE may be limited. For example, channel power control parameter(s) based on DL pathloss may be included. For example, channel power control parameter(s) based on DL pathloss of the P-UE may be limited.

Based on an embodiment of the present disclosure, UL-SL prioritization may be different for each UE type. For example, UL-SL prioritization may also include a SL prioritization situation in in-device coexistence of NR/LTE. For example, a set of thresholds may be different for each UE type. For example, in in-device coexistence, since SL transmission of the P-UE is important, SL transmission of the P-UE may be prioritized. For example, in in-device coexistence, since SL transmission of the P-UE is important, SL transmission of the P-UE may be prioritized over other SL receptions.

For example, even though the P-UE has few opportunities to perform SL transmission, it may be a problem whether the P-UE should give up SL transmission due to UL transmission. Accordingly, SL transmission of the P-UE may be prioritized over UL transmission.

For example, whether or not the sensing operation is performed and/or whether or not the sensing operation is simplified, etc., may be (pre-)configured for each resource pool. For example, if not performing the sensing operation is supported and performing the simplified sensing operation is supported, the UE may determine whether and how to perform the sensing operation implementationally. For example, the UE may determine whether and how to perform the sensing operation for each congestion level and/or for each service type and/or for each remaining power and/or for each power saving mode. For example, if an interference level is high, or if its packet transmission has a relatively low priority, or if the remaining battery is sufficient (more than a threshold), the UE may select partial sensing. For example, the UE may be a UE having RX capability. For example, if the above-described condition is not satisfied, the UE may fallback to random selection. For example, the above-described disclosure may be interpreted as the UE selecting a different resource selection scheme according to a priority of service(s).

Meanwhile, legacy UE(s) may determine reserved resource(s) or candidate resource(s) for SL transmission after performing the sensing operation. Thereafter, the UE may continuously attempt to detect SCI(s), and the UE may perform re-evaluation, reselection, or pre-emption for the reserved resource(s) or the candidate resource(s) based on reserved resource(s) indicated by the detected SCI(s) and RSRP measurement value(s) corresponding thereto. For example, if an RSRP measurement value for reserved resource(s) indicated by a newly detected SCI exceeds a specific threshold, and if the reserved resource(s) overlaps with candidate resource(s) for transmission of the UE, the UE may perform a process of reselecting the candidate resource(s). For example, the newly detected resource(s) may be resource(s) that satisfies the pre-emption condition (e.g., if a reception priority value is less than a specific threshold value and the reception priority value is less than a transmission priority value).

Based on the re-evaluation operation and/or the pre-emption operation, the UE may have to continuously attempt SCI detection after reselecting resource(s), which may increase power consumption of the UE. Accordingly, for example, whether to perform the continuous sensing operation and/or whether to perform the re-evaluation operation and/or whether to perform the pre-emption operation may be configured or performed differently for each UE type. For example, the P-UE or the power saving UE may omit the continuous sensing operation and/or the re-evaluation operation and/or the pre-emption operation (even if the corresponding operation is configured in the corresponding resource pool). For example, in the case of performing the continuous sensing operation and/or the re-evaluation operation and/or the pre-emption operation, a time restriction for a time of SCI detection to be reflected/considered may be determined or configured differently for each UE type. For example, if it is assumed that the legacy UE determines whether to perform the re-evaluation operation and/or whether to perform the pre-emption operation based on SCI(s) detected from a time point m-T3 (herein, m is a candidate resource for SL transmission (that appears first in time), the P-UE may determine whether to perform the re-evaluation operation and/or whether to perform the pre-emption operation based on SCI(s) detected from a time point m-T'3 (e.g., herein, T'3 is a value greater than or equal to T3).

For example, in the case of determining reserved resource(s) indicated by SCI(s) detected in a sensing window, whether or not to apply a period and information on the number of periods (e.g., counter scaling) may be different based on a type of a UE. For example, the legacy UE determines available resource(s) by extending the indicated reserved resource by only one period, but the P-UE may determine available resource(s) by extending the indicated reserved resource by a plurality of periods. For example, the legacy UE determines available resource(s) by extending the indicated reserved resource by only a plurality of periods, but the P-UE may determine available resources(s) by extending the indicated reserved resource by a one period or a small number of periods.

For example, a threshold value used to determine whether or not to exclude the reserved resource(s) from the available resource(s) based on RSRP measurement value(s) for the indicated reserved resource(s) may be (pre-)configured based on a type of a UE. For example, a size of a resource reselection window may be determined differently based on a type of a UE. For example, at least one of the start location of the resource reselection window, the lower bound of the start location, or the upper bound of the start location may be (pre-)configured differently based on a type of a UE. For example, at least one of the end location of the resource reselection window, the lower bound of the end location, or the upper bound of the end location may be (pre-)configured differently based on a type of a UE. For example, a value of the allowable lower bound of a ratio of available resources to total resources within the resource reselection window (e.g., X value) may be (pre-)configured differently based on a type of a UE.

For example, a size of a resource sensing window may be determined differently based on a type of a UE. For example, at least one of the start location of the resource sensing window, the lower bound of the start location, or the upper bound of the start location may be (pre-)configured differently based on a type of a UE. For example, at least one of the end location of the resource sensing window, the lower bound of the end location, or the upper bound of the end location may be (pre-)configured differently based on a type of a UE.

For example, a CBR measurement window and/or a CR evaluation window may be (pre-)configured differently for each UE type.

For example, the UE may distinguish/determine a type of a UE (e.g., V-UE, P-UE) based on the first SCI and/or the second SCI and/or the PSSCH. For example, the first SCI may indicate the type of the UE by using a reserved field. For example, the type of the UE may be distinguished/determined based on a format of the second SCI. For example, the type of the UE may be distinguished/determined based on a PSCCH scrambling sequence and/or a DMRS sequence and/or a PSCCH CRC masking sequence. For example, the type of the UE may be distinguished/determined based on an L1 source ID and/or an L1 destination ID. For example, if the UE determines whether or not to exclude the reserved resource(s) from the available resources(s) based on RSRP measurement value(s) for the reserved resource(s) indicated by SCI(s), an RSRP threshold to be used for the determination may be (pre-)configured differently based on the type of the UE.

Meanwhile, based on the type of the UE, the SL reception operation may be limited. In the above situation, a specific UE may not be able to perform PSFCH reception corresponding to PSCCH/PSSCH transmission after the PSCCH/PSSCH transmission or may receive a PSFCH in a restricted location. For example, whether or not to activate SL HARQ feedback may be configured/indicated differently, based on the type of the UE and/or the sensing operation method performed by the UE or whether or not the sensing operation is performed. For example, a UE that does not perform the sensing operation and/or a UE that performs the simplified sensing operation may not support or deactivate SL HARQ feedback. For example, PSFCH-related configuration(s) (e.g., a period of PSFCH resources and/or the location of RBs and/or the number of CSs and/or a timing or a slot offset between a PSSCH and a PSFCH) may be (pre-)configured differently, based on the type of the UE and/or the sensing operation method performed by the UE or whether or not the sensing operation is performed.

For example, whether or not to activate CSI reporting triggering may be configured/indicated differently, based on the type of the UE and/or the sensing operation method performed by the UE or whether or not the sensing operation is performed. For example, the UE that does not perform the sensing operation and/or the UE that performs the simplified sensing operation may not perform CSI reporting triggering. Alternatively, for example, for the UE that does not perform the sensing operation and/or the UE that performs the simplified sensing operation, a size of a CSI reporting window may be (pre-)configured differently or configured (through PC5-RRC signaling).

For example, a supportable power control method may be determined, based on the type of the UE and/or the sensing operation method performed by the UE or whether or not the sensing operation is performed. For example, the UE that does not perform the sensing operation and/or the UE that performs the simplified sensing operation may not support or deactivate the SL pathloss-based power control scheme. For example, for the UE that does not perform the sensing operation and/or the UE that performs the simplified sensing operation, Po or a nominal power value may be (pre-)configured differently. For example, for the UE that does not perform the sensing operation and/or the UE that performs the simplified sensing operation, a maximum transmit power value may be (pre-)configured.

For example, a group of thresholds used to determine a priority between UL and SL may be (pre-)configured differently or configured (through RRC signaling), based on the type of the UE and/or the sensing operation method performed by the UE or whether or not the sensing operation is performed.

For example, the second SCI mapping-related parameter(s) (e.g., beta candidate value(s), alpha value(s), etc.) may be (pre-)configured differently, based on the type of the UE and/or the sensing operation method performed by the UE or whether or not the sensing operation is performed.

For example, PSSCH DMRS pattern candidate(s) may be (pre-)configured differently, based on the type of the UE and/or the sensing operation method performed by the UE or whether or not the sensing operation is performed. For example, PSSCH DMRS patterns which can be indicated may be limited based on the type of the UE and/or the sensing operation method performed by the UE or whether or not the sensing operation is performed.

For example, a transmission scheme of a PSSCH may be limited based on the type of the UE and/or the sensing operation method performed by the UE or whether or not the sensing operation is performed. For example, the transmission scheme of the PSSCH may include the number of transmit antenna ports or a rank. For example, the transmission scheme of the PSSCH may include information related to available MCS table(s).

Hereinafter, random resource selection and partial sensing operation will be described in detail.

In this section, high-level views on what further enhancements can be considered for the resource allocation to reduce the power consumption are provided, when applying the principle of LTE SL to NR mode 2 operation.

According to the partial sensing operation of LTE SL, when a power saving UE (P-UE) makes resource (re)selection decision at TTI m, the possible candidates resources, i.e., Y slots, are selected in the selection window (i.e., [m+T1, m+T2]), and the minimum allowed value of Y is (pre)configured. Depending on what Y value is (pre)configured, the level of power consumption and the number of possible retransmissions are changed. To avoid the problematic case where the (pre)configured Y value is less than the necessary number of retransmissions, it can be considered that different Y value is (pre)configured for each priority value (or service type/requirement). By doing so, it would be possible to efficiently support different number of retransmissions required for different service type even in case of partial sensing operation. In addition, if the interference level (e.g., CBR) in the resource pool is low, the probability of resource collision among different UEs could be low from an average point of view. In this case, even if a relatively small Y value is applied, the performance degradation will not be significant. When there is a UE performing the sensing operation in the same resource pool, it would be desirable to reduce interference to resources selected by the corresponding UE as much as possible. Considering these aspects, it can be defined that different (pre)configured Y values are applied to different interference levels of resource pool or depending on whether or not the UE performing sensing operation is detected (e.g., especially when the information of UE type is signaled via SCI). Also it needs to discuss whether to simply reuse the LTE SL principle of determining the minimum number or location of slots to be monitored for slot n within the set of Y slots. To be specific, in LTE SL, the P-UE senses at least slot n−100*k for any candidate resource in slot n within the set of Y slots, and the set of k is (pre)configured with each element in the range [1, 10]. We think that in NR mode 2, since there is no need to perform the RSSI measurement within the sensing window, the upper bound of k value is set to the maximum reservation periodicity allowed in the resource pool. If the first slot to be monitored is always located 100 slots before slot n, it would be difficult to avoid the collision with a UE that has reserved resources with a short periodicity (e.g., <100 slots). This problem becomes worse when only candidates with the relatively short reservation periods are allowed in the resource pool. Therefore, the constant value (i.e., 100) in the equation of 'slot n−100*k' can be changed to a (pre)configurable value.

For example, due to ((LTE/NR) SL and/or UL) transmission operation(s) of the UE, if the UE fails to perform monitoring for some slots among slots M (e.g., M=N−100*K) (in the sensing window) in which sensing related to the slot N selected based on the Y value (described above) in the selection window should be performed, the UE may be configured to exclude the slot N from Y slots selected in the selection window. For example, due to ((LTE/NR) SL and/or UL) transmission operation(s) of the UE, if the UE fails to perform monitoring for some slots among slots M (e.g., M=N−100*K) (in the sensing window) in which sensing related to the slot N selected based on the Y value (described above) in the selection window should be performed, the UE may be configured to select the slot N with a lower priority in the selection window.

For example, due to ((LTE/NR) SL and/or UL) transmission operation(s) of the UE, if the UE fails to perform monitoring for the number/ratio of slots greater than or equal to a pre-configured threshold number/ratio (TH_NMN) among slots M (e.g., M=N−100*K) (in the sensing window) in which sensing related to the slot N selected based on the Y value (described above) in the selection window should be performed, the UE may be configured to exclude the slot N from Y slots selected in the selection window. For example, due to ((LTE/NR) SL and/or UL) transmission operation(s) of the UE, if the UE fails to perform monitoring for the number/ratio of slots greater than or equal to a pre-configured threshold number/ratio (TH_NMN) among slots M (e.g., M=N−100*K) (in the sensing window) in which sensing related to the slot N selected based on the Y value (described above) in the selection window should be performed, the UE may be configured to select the slot N with a lower priority in the selection window.

For example, due to ((LTE/NR) SL and/or UL) transmission operation(s) of the UE, if the UE fails to perform monitoring for all slots among slots M (e.g., M=N−100*K) (in the sensing window) in which sensing related to the slot N selected based on the Y value (described above) in the selection window should be performed, the UE may be configured to exclude the slot N from Y slots selected in the selection window. For example, due to ((LTE/NR) SL and/or UL) transmission operation(s) of the UE, if the UE fails to perform monitoring for all slots among slots M (e.g., M=N−100*K) (in the sensing window) in which sensing related to the slot N selected based on the Y value (described above) in the selection window should be performed, the UE may be configured to select the slot N with a lower priority in the selection window.

If the above rule is applied, for example, the UE may select Y slots (limitedly or preferentially) in the selection window in order to be able to sense all (related) slots based on a pre-configured K value. For example, the UE may select Y slots (limitedly or preferentially) in the selection window in order to be able to sense the number of slots (TH_YMN) greater than or equal to a pre-configured threshold number/ratio among (related) slots based on a pre-configured K value.

For example, if the UE performs (periodic) resource selection/reservation related to a plurality of SL grants (and/or booking process) (BK_PR) based on partial sensing, and if the UE selects Y slots in a selection window related to a specific BK_PR #A, the UE may preferentially select Y slots so that (slots in which sensing should be performed based on the K value) overlap as much as possible with slots in which sensing is performed in other BK_PR #B related resource selection/reservation. For example, if the UE performs (periodic) resource selection/reservation related to a plurality of SL grants (and/or booking process) (BK_PR) based on partial sensing, and if the UE selects Y slots in a selection window related to a specific BK_PR #A, the UE may preferentially select Y slots so that (slots in which sensing should be performed based on the K value) overlap with slots in which sensing is performed in other BK_PR #B related resource selection/reservation by greater than or equal to a pre-configured threshold number (TH_OMN). For example, if the UE selects/determines sensing slot(s) for BK_PR #A related resource selection/reservation, the UE may preferentially select/use sensing slot(s) used for BK_PR #B related resource selection/reservation.

For example, unlike the V-UE, the (maximum or minimum) size of the sensing window and/or the (maximum or minimum) number of sensing slots (SEN_WIN) of the P-UE may be considered/determined as a maximum value among resource reservation period values configured/allowed for a resource pool. For example, unlike the V-UE, the (maximum or minimum) size of the sensing window and/or the (maximum or minimum) number of sensing slots (SEN_WIN) of the P-UE may be considered/determined as a minimum value among resource reservation period values configured/allowed for a resource pool. For example, unlike the V-UE, the (maximum or minimum) size of the sensing window and/or the (maximum or minimum) number of sensing slots (SEN_WIN) of the P-UE may be considered/determined as an average value of resource reservation period values configured/allowed for a resource pool. For example, unlike the V-UE, the (maximum or minimum) size of the sensing window and/or the (maximum or minimum) number of sensing slots (SEN_WIN) of the P-UE may be considered/determined as a pre-configured resource reservation period value configured/allowed for a resource pool. For example, based on the type of the UE, the (maximum or minimum) size of the sensing window and/or the (maximum or minimum) number of sensing slots may be configured differently.

For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for each priority of service(s)/packet(s). For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for each service/packet requirement. For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for each remaining PDB value related to transmission packet(s). For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for each congestion level (e.g., CBR) in a resource pool. For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) based on whether or not to transmit packet(s) (e.g., MAC PDU) based on HARQ feedback. For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for performing re-evaluation. For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for performing pre-emption. For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for resource reselection based on re-evaluation. For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for resource reselection based on pre-emption. For example, at least one of the (maximum or minimum) number of slots M (e.g., M=N−100*K) (in the sensing window) in which the UE should perform sensing related to the slot N selected based on the Y value (described above) in the selection window, pattern/combination, the (maximum or minimum) size of the sensing window, and/or the (maximum or minimum) number of sensing slots may be configured (independently or differently) for resource selection based on initial sensing.

For example, if the UE performs resource selection/reservation based on initial sensing, the (maximum or minimum) size of the sensing window and/or the (maximum or minimum) number of sensing slots (INI_SENS) related to the initial sensing may be configured to be relatively large and/or many (e.g., 1 second or the number of slots within 1 second). On the other hand, for example, if the UE performs the pre-emption check/operation for selected/reserved resource(s) (signaled by a SCI) and/or the re-evaluation operation for reselected resource(s) and/or the re-evaluation operation for resource(s) selected based on initial sensing afterwards, the (maximum or minimum) size of the sensing window and/or the (maximum or minimum) number of sensing slots (AF_SENS) related to the operation may be configured to be relatively small and/or few (e.g., 32 slots).

For example, if the UE performs resource selection/reservation based on initial sensing, the (maximum or minimum) size of the sensing window and/or the (maximum or minimum) number of sensing slots (INI_SENS) related to the initial sensing may be configured to be relatively small and/or few. On the other hand, for example, if the UE performs the pre-emption check/operation for selected/reserved resource(s) (signaled by a SCI) and/or the re-evaluation operation for reselected resource(s) and/or the re-evaluation operation for resource(s) selected based on initial sensing afterwards, the (maximum or minimum) size of the sensing window and/or the (maximum or minimum) number of sensing slots (AF_SENS) related to the operation may be configured to be relatively large and/or many.

For example, if the UE performs random resource selection (without sensing) and/or resource selection based on partial sensing, other UE(s) needs to effectively perform sensing/collision avoidance for the resource(s) (based on re-evaluation/pre-emption). To this end, in the selection window, the UE may (preferentially or limitedly) select resource(s) located after a pre-configured offset value (OFF_VAL) from the starting time of the selection window.

For example, the UE may be configured to signal/transmit information related to the performed sensing type (e.g., no sensing, partial sensing, full sensing) and/or information related to the resource selection/reservation type (e.g., random selection) through pre-configured bit(s) (e.g., reserved bit(s)) and/or a field included in a SCI. Herein, for example, if the UE detects/determines transmission resource(s) (SEN_RSC) (of other UE(s) (e.g., may be limited to P-UE(s))) selected/reserved based on the pre-configured sensing type and/or the resource selection/reservation type (e.g., may be configured to at least one of no sensing (or partial sensing or full sensing), or random selection), and if selected/reserved resource(s) of the UE overlapping SEN_RSC exists in the pre-emption procedure and/or the re-evaluation procedure, (A) the UE (always) to perform resource reselection, and/or (B) the UE may perform the pre-emption operation and/or the re-evaluation operation by assuming that a (packet) priority related to SEN_RSC is a pre-configured value (or by adding a pre-configured offset value (PRI_OFF) to a (packet) priority related to SEN_RSC or by assuming that a (packet) priority related to SEN_RSC is (always) higher than its own (packet) priority).

For example, if the UE of a pre-configured type receives again a MAC PDU successfully decoded (exceptionally), the UE may be configured to omit PSFCH transmission (e.g., ACK). For example, if the UE of the pre-configured type receives again the MAC PDU successfully decoded (exceptionally), the UE may perform PSFCH transmission up to a pre-configured threshold number of times (RE_THNUM).

For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) for each priority of service(s)/packet(s). For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) for each requirement of service(s)/packet(s). For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) for each remaining PDB value related to transmission packet(s). For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) for each congestion level (e.g., CBR) in a resource pool. For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) based on whether or not to transmit packet(s) (e.g., MAC PDU) based on HARQ feedback. For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) for performing re-evaluation. For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) for performing pre-emption. For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) for resource reselection based on re-evaluation. For example, the parameter(s) (e.g., TH_NMN, TH_YMN, TH_OMN, SEN_WIN, INI_SENS, AF_SENS, OFF_VAL, PRI_OFF and/or RE_THNUM) and/ or whether the rule(s) of the present disclosure is applied or not may be configured (independently or differently) for resource reselection based on pre-emption. For example, the parameter(s) (e.g., TH_NMN, TH_YMN, TH_OMN, SEN_WIN, INI_SENS, AF_SENS, OFF_VAL, PRI_OFF and/or RE_THNUM) and/or whether the rule(s) of the present disclosure is applied or not may be configured (independently or differently) for resource selection based on initial sensing.

Proposal 1: For the partial sensing operation, RAN1 discusses how to (pre)configure/determine the minimum number of candidate slots within the selection window and the minimum number or location of slots to be monitored within the sensing window.

When the TX pool configuration allows both partial sensing operation and random resource selection and the P-UE is not instructed to use only one of them, it needs to discuss how to select one of them. For example, it can be defined that if the interference level of resource pool/amount of remaining battery is higher than the (pre)configured threshold (or the priority value of packet to be transmitted is lower than the (pre)configured threshold), P-UE selects the partial sensing operation. Otherwise, the random resource selection is selected.

Proposal 2: For the case when TX pool (pre)configuration allows both partial sensing operation and random resource selection, RAN1 discusses whether or how to define the criteria to select one of them.

One of ways to reduce P-UE's power consumption is to lower the probability of retransmissions (or increase the success rate of packet delivery). In this sense, we can discuss the potential enhancements to protect P-UE's transmission. For example, after defining that the UE type information is singled via SCI, when a resource reserved by P-UE is detected during the sensing operation (or the re-evaluation/pre-emption procedure), whether to exclude these resources (from the set of candidate resources within the selection window) is determined based on the separately (pre)configured RSRP threshold. The RSRP threshold value applied to the resource reserved by P-UE could be set relatively low than that applied to the resource reserved by Vehicle UE (V-UE). Alternatively, it can be considered to add an (pre)configured offset value to the RSRP value measured in the resource reserved by P-UE. In the pre-emption operation, different (pre)configured priority threshold values can be applied between the resources reserved by different UE types (e.g., applying a relatively high priority threshold value to the resource reserved by P-UE). Also, in order for P-UE to select a resource having the relatively low interference level, the minimum percentage (X) of candidate resources remaining after the resource exclusion procedure (or the minimum value of T2 for the selection window) can be (pre)configured differently from V-UE. When the ratio of identified candidate resources to the total number of resources in the selection window is less than X %, the upper limit of the number of RSRP threshold increments (or the increased RSRP threshold value) can be (pre)configured for P-UE.

Proposal 3: RAN1 discusses whether or how to protect P-UE's reserved resource and make P-UE select a resource with low interference level.

When using the random resource selection, it is desirable to maximally reduce the interference to resources selected by another UE that has performed the sensing operation. In this sense, for NR mode 2, the mechanism of LTE SL can be reused that the randomly selected resource is reselected following the periodic resource reservation procedure, if the partial sensing is allowed in the TX pool.

Proposal 4: RAN1 discusses how to make other UEs (performing the sensing operation) avoid the resource randomly selected by P-UE.

Since the re-evaluation/pre-emption procedures require additional power consumption, it needs to discuss whether/when P-UE performs these operations. For example, it can be simply defined that P-UE does not support/perform those kind of operations, but the probability that the transmission resource of P-UE collides with that of another UE will increase. Alternatively, whether or not the P-UE performs the re-evaluation/pre-emption operations could be determined by considering e.g., the interference level of resource pool, the priority of packet to be transmitted, and the amount of remaining battery. To be specific, in case when the interference level of resource pool/amount of remaining battery is lower than the (pre)configured threshold, it is not necessary for P-UE to perform such operations. In addition, the re-evaluation operation is performed only for the packet with a low priority value, while the pre-emption operation is performed only for the packet with a high priority value. The frequency/portion of performing the re-evaluation/pre-emption operations can be (pre)configured for P-UE.

Proposal 5: RAN1 discusses whether or how to allow the re-evaluation/pre-emption operations to P-UE.

Considering the possibility that P-UE does not have SL RX capability, it needs to discuss how to support the PHY parameter adjustment in terms of congestion control. We think that it could be possible to reuse the principle of LTE SL that the selection of PHY parameter is based on the (pre)configured CBR value.

Proposal 6: When P-UE does not have SL RX capability, RAN1 discusses how to support the PHY parameter adjustment in terms of congestion control.

One of topics need to be discussed further is whether P-UE can transmit HARQ feedback (FD) enabled MAC PDU by using the randomly selected resource. If it is allowed, the transmission on the randomly selected resource could generate the interference to both PSSCH/PSCCH RX and PSFCH RX of other UEs. To resolve this problem, for example, it can be defined that HARQ FD enabled MAC PDU is transmitted only using the resource selected by the sensing operation (i.e., only HARQ FD disabled MAC PDU can be transmitted using the randomly selected resource). Alternatively, the PSFCH resource set can be additionally (pre)configured for the randomly selected resource, which is orthogonal to the PSFCH resource set of the resource selected by the sensing operation. The resource pool used for HARQ FD enabled MAC PDU transmission can be (pre)configured separately between the randomly selected resource and the resource selected by using the sensing operation. The minimum time gap between the PSSCH and the associated PSFCH can be also (pre)configured separately for P-UE, which could be larger than that of V-UE (e.g., achieving the power consumption reduction gain resulting from low the processing/clock speed).

Proposal 7: RAN1 discusses whether or how to allow HARQ FD enabled MAC PDU transmission by using the randomly selected resource.

In addition, it needs to discuss whether the OLPC parameter/maximum SL TX power value (in SL/DL PL based power control procedure) are the same between P-UE and V-UE. For example, in order to reduce the power consumption, the relatively small OLPC parameter/maximum SL TX power value can be (pre)configured separately for P-UE.

Proposal 8: RAN1 discusses whether or how to support P-UE's TX power control.

Since dropping of SL packet TX has a negative effect in terms of power consumption reduction, it is necessary to have a discussion on how to handle P-UE's SL TX in the UL-SL prioritization procedure. For example, it can be defined that when SL TX is overlapped with UL TX from the P-UE perspective, a separately (pre)configured SL (or UL) priority threshold is used to decide which TX is dropped. This SL (or UL) priority threshold value could be relatively larger (or smaller) than that used for V-UE to perform the UL-SL prioritization procedure. Alternatively, an (pre)configured offset value can be added to the priority value of P-UE's SL TX. By doing so, it could be possible to avoid the frequent dropping of P-UE's SL TX.

Proposal 9: RAN1 discusses whether or how to handle P-UE's SL TX in the UL-SL prioritization procedure.

If the reliability of packet transmission increase, it could be helpful for P-UE to reduce the power consumption. In this sense, the beta value determining/adjusting the number of $2^{nd}$ SCI mapping REs (or the alpha value determining the upper limit of $2^{nd}$ SCI mapping REs) can be (pre)configured separately for P-UE, which could be larger than that of V-UE (e.g., achieving the $2^{nd}$ SCI decoding performance gain resulting from low coding rate). The interference level on the selected resource could be different depending on what kind of sensing method is used. Considering this aspect, the different beta value sets can be (pre)configured between the random resource selection and the partial sensing operation (or between the full sensing operation and the partial sensing operation).

Proposal 10: RAN1 discusses whether or how to increase the reliability of P-UE's packet transmission.

To reduce the complexity/power consumption of P-UE, it needs to discuss whether to support/perform PSSCH TX with 2 layers (or high modulation order) and SL-SSB TX. In LTE SL, P-UE performing partial sensing operation or random resource selection does not transmit SL-SSB. For example, it can be defined that P-UE performs SL-SSB TX only in the nearest SLSS slot before the actual packet is to be transmitted. With this approach, it is possible to reduce the power consumed by SL-SSB TX.

Proposal 11: RAN1 discusses how to define P-UE's capability for e.g., PSSCH TX with 2 layers, high modulation order, and SL-SSB TX.

Based on various embodiments of the present disclosure, the UE may perform resource (re)selection in a different manner, based on the type of the UE and/or based on the sensing operation method performed by the UE or whether the sensing operation is performed. Through this, it is possible to minimize resource collision while maximizing a power saving gain.

Figure 15:
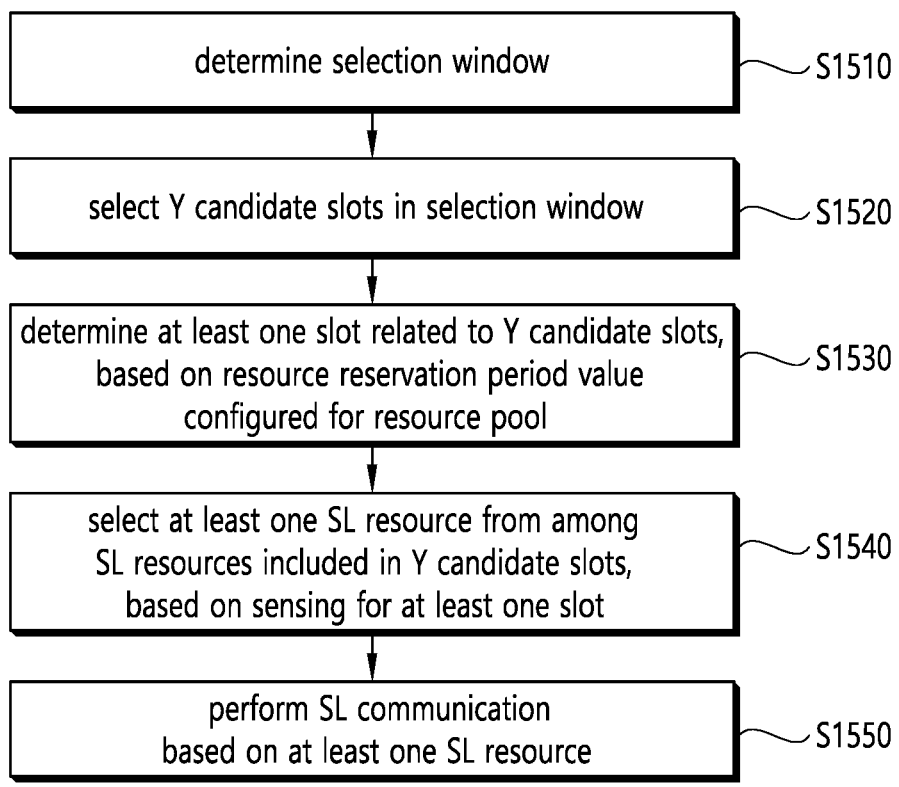
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, the first device may determine a selection window. In step S1520, the first device may select Y candidate slots in the selection window. In step S1530, the first device may determine at least one slot related to the Y candidate slots, based on a resource reservation period value configured for a resource pool. In step S1540, the first device may select at least one SL resource from among sidelink (SL) resources included in the Y candidate slots, based on sensing for the at least one slot. In step S1550, the first device may perform SL communication based on the at least one SL resource. For example, a value of Y may be a positive integer.

Additionally, for example, the first device may determine the value of Y based on a priority of a medium access control protocol data unit (MAC PDU) to be transmitted. For example, at least one candidate value of Y may be configured for the first device for each priority.

Additionally, for example, the first device may determine the value of Y based on a congestion level for the resource pool. For example, at least one candidate value of Y may be configured for the first device for each congestion level.

For example, the Y candidate slots may be selected to be able to be informed by a prior sidelink control information (SCI).

Additionally, for example, the first device may receive, from a second device, a first sidelink control information (SCI) including information related to a first priority and information related to a first resource, and the first device may receive, from a third device, a second SCI including information related to a second priority and information related to a second resource. For example, the second device may be a device for which power saving is required, and the third device may be a device for which power saving is not required.

Additionally, for example, the first device may determine whether or not to reselect the first resource based on a first RSRP threshold, based on the first resource being overlapped with the at least one SL resource, and the first device may determine whether or not to reselect the second resource based on a second RSRP threshold, based on the second resource being overlapped with the at least one SL resource. For example, the first RSRP threshold related to a device for which power saving is required may be different from the second RSRP threshold related to a device for which power saving is not required.

Additionally, for example, the first device may determine whether or not to reselect the first resource based on the information related to the first priority and a first priority threshold, based on the first resource being overlapped with the at least one SL resource, and the first device may determine whether or not to reselect the second resource based on the information related to the second priority and a second priority threshold, based on the second resource being overlapped with the at least one SL resource. For example, the first priority threshold related to a device for which power saving is required may be different from the second priority threshold related to a device for which power saving is not required.

Additionally, for example, the first device may determine whether or not to reselect the first resource based on information related to a third priority, based on the first resource being overlapped with the at least one SL resource. For example, the information related to the third priority may be a value obtained by applying a priority offset value to a first priority threshold related to a device for which power saving is required. Additionally, for example, the first device may determine whether or not to reselect the second resource based on the information related to the second priority, based on the second resource being overlapped with the at least one SL resource.

For example, the first SCI includes information may represent a power saving device.

For example, based on resource selection based on full sensing being not allowed for the resource pool, the first device may not be allowed to perform a re-evaluation operation or a pre-emption operation on the resource pool.

For example, random resource selection or resource selection based on partial sensing may be allowed for the resource pool. For example, the at least one SL resource may be selected based on the partial sensing, based on a congestion level for the resource pool being higher than a threshold level. For example, the at least one SL resource may be selected based on the partial sensing, based on a remaining battery amount of the first device greater than a threshold. Additionally, for example, the first device may select one of the random resource selection or the resource selection based on the partial sensing, based on a priority of medium access control protocol data unit (MAC PDU) to be transmitted.

For example, the resource reservation period value may include a maximum resource reservation period value. For example, an interval between the at least one slot may not exceed the maximum resource reservation period value.

For example, the at least one slot may be obtained by a following equation.

$$\text{at least one slot} = n - a*k$$

Herein, n may be Y candidate slots, and k may be a bitmap for representing the at least one slot, and a may be the resource reservation period value.

The proposed method may be applied to the device(s) based on various embodiments of the present disclosure. First, the processor 102 of the first device 100 may determine a selection window. In addition, the processor 102 of the first device 100 may select Y candidate slots in the selection window. In addition, the processor 102 of the first device 100 may determine at least one slot related to the Y candidate slots, based on a resource reservation period value configured for a resource pool. In addition, the processor 102 of the first device 100 may select at least one SL resource from among sidelink (SL) resources included in the Y candidate slots, based on sensing for the at least one slot. In addition, the processor 102 of the first device 100 may control the transceiver 106 to perform SL communication based on the at least one SL resource. For example, a value of Y may be a positive integer.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: determine a selection window; select Y candidate slots in the selection window; determine at least one slot related to the Y candidate slots, based on a resource reservation period value configured for a resource pool; select at least one SL resource from among sidelink (SL) resources included in the Y candidate slots, based on sensing for the at least one slot; and perform SL communication based on the at least one SL resource. For example, a value of Y may be a positive integer.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: determine a selection window; select Y candidate slots in the selection window; determine at least one slot related to the Y candidate slots, based on a resource reservation period value configured for a resource pool; select at least one SL resource from among sidelink (SL) resources included in the Y candidate slots, based on sensing for the at least one slot; and perform SL communication based on the at least one SL resource. For example, a value of Y may be a positive integer.

Based on an embodiment of the present disclosure, a non-transitory computer-readable storage medium storing instructions may be provided. For example, the non-transitory computer-readable storage medium storing instructions, when executed, may cause a first device to: determine a selection window; select Y candidate slots in the selection window; determine at least one slot related to the Y candidate slots, based on a resource reservation period value configured for a resource pool; select at least one SL resource from among sidelink (SL) resources included in the Y candidate slots, based on sensing for the at least one slot; and perform SL communication based on the at least one SL resource. For example, a value of Y may be a positive integer.

Figure 16:
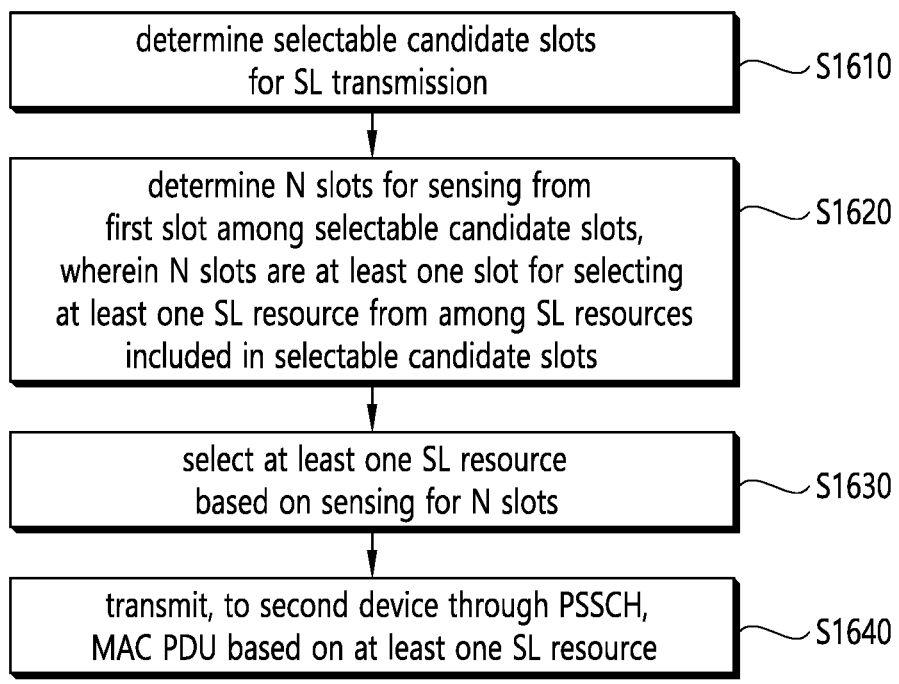
FIG. 16 shows a method for a first device to perform wireless communication, based on an embodiment of the present disclosure.

FIG. 16 shows a method for a first device to perform wireless communication, based on an embodiment of the present disclosure. The embodiment of FIG. 16 may be combined with various embodiments of the present disclosure.

Referring to FIG. 16, in step S1610, the first device may determine selectable candidate slots for sidelink (SL) transmission. In step S1620, the first device may determine N slots for sensing from a first slot among the selectable candidate slots. For example, the N slots may be at least one slot for selecting at least one SL resource from among SL resources included in the selectable candidate slots. In step S1630, the first device may select the at least one SL resource based on the sensing for the N slots. In step S1640, the first device may transmit, to a second device through a physical sidelink shared channel (PSSCH), a medium access control protocol data unit (MAC PDU) based on the at least one SL resource. For example, a value of N may be a positive integer.

For example, based on a change of a location of the first slot, a location of the N slots for the sensing may be changed.

For example, the N slots for the sensing may be determined based on a location of the first slot among the selectable candidate slots regardless of a timing in which resource selection is triggered.

For example, the at least one SL resource may be selected from among candidate SL resources. For example, a number of candidate SL resources may be greater than or equal to X percent of a total number of candidate resources, and a value of X may be configured differently based on whether or not the first device is a device requiring power saving, and the value of X may be a positive integer. For example, based on a number of candidate SL resources being less than X percent of a total number of candidate resources, and the first device being a device requiring power saving, reference signal received power (RSRP) threshold boosting to secure the number of candidate SL resources greater than or equal to X percent of the total number of candidate resources may be not allowed for the first device, and a value of X may be a positive integer.

Additionally, for example, the first device may transmit sidelink control information (SCI) through the PSSCH. For example, based on whether or not the first device is a device requiring power saving, a parameter for mapping the SCI on resources related to the PSSCH may be configured differently. For example, based on a resource selection method of the first device, a parameter for mapping the SCI on resources related to the PSSCH may be configured differently, and the resource selection method may include random selection-based resource selection, partial sensing-based resource selection, or full sensing-based resource selection.

Additionally, for example, the first device may transmit a demodulation reference signal (DMRS). For example, based on whether or not the first device is a device requiring power saving, candidate patterns for mapping the DMRS may be configured differently. For example, based on a resource selection method of the first device, candidate patterns for mapping the DMRS may be configured differently, and the resource selection method may include random selection-based resource selection, partial sensing-based resource selection, or full sensing-based resource selection.

For example, based on whether or not the first device is a device requiring power saving, candidate modulation and coding scheme (MCS) tables may be configured differently.

For example, based on a resource selection method of the first device, candidate modulation and coding scheme (MCS) tables may be configured differently, and the resource selection method may include random selection-based resource selection, partial sensing-based resource selection, or full sensing-based resource selection.

For example, based on the first device performing partial sensing-based resource selection, the first device may not be allowed to enable hybrid automatic repeat request (HARD) feedback for the MAC PDU.

The proposed method may be applied to the device(s) based on various embodiments of the present disclosure. First, the processor 102 of the first device 100 may determine selectable candidate slots for sidelink (SL) transmission. In addition, the processor 102 of the first device 100 may determine N slots for sensing from a first slot among the selectable candidate slots. For example, the N slots may be at least one slot for selecting at least one SL resource from among SL resources included in the selectable candidate slots. In addition, the processor 102 of the first device 100 may select the at least one SL resource based on the sensing for the N slots. In addition, the processor 102 of the first device 100 may control the transceiver 106 to transmit, to a second device through a physical sidelink shared channel (PSSCH), a medium access control protocol data unit (MAC PDU) based on the at least one SL resource. For example, a value of N may be a positive integer.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: determine selectable candidate slots for sidelink (SL) transmission; determine N slots for sensing from a first slot among the selectable candidate slots, wherein the N slots are at least one slot for selecting at least one SL resource from among SL resources included in the selectable candidate slots; select the at least one SL resource based on the sensing for the N slots; and transmit, to a second device through a physical sidelink shared channel (PSSCH), a medium access control protocol data unit (MAC PDU) based on the at least one SL resource. For example, a value of N may be a positive integer.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: determine selectable candidate slots for sidelink (SL) transmission; determine N slots for sensing from a first slot among the selectable candidate slots, wherein the N slots are at least one slot for selecting at least one SL resource from among SL resources included in the selectable candidate slots; select the at least one SL resource based on the sensing for the N slots; and transmit, to a second UE through a physical sidelink shared channel (PSSCH), a medium access control protocol data unit (MAC PDU) based on the at least one SL resource. For example, a value of N may be a positive integer.

Based on an embodiment of the present disclosure, a non-transitory computer-readable storage medium storing instructions may be provided. For example, the non-transitory computer-readable storage medium storing instructions, when executed, may cause a first device to: determine selectable candidate slots for sidelink (SL) transmission; determine N slots for sensing from a first slot among the selectable candidate slots, wherein the N slots are at least one slot for selecting at least one SL resource from among SL resources included in the selectable candidate slots; select the at least one SL resource based on the sensing for the N slots; and transmit, to a second device through a physical sidelink shared channel (PSSCH), a medium access control protocol data unit (MAC PDU) based on the at least one SL resource. For example, a value of N may be a positive integer.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
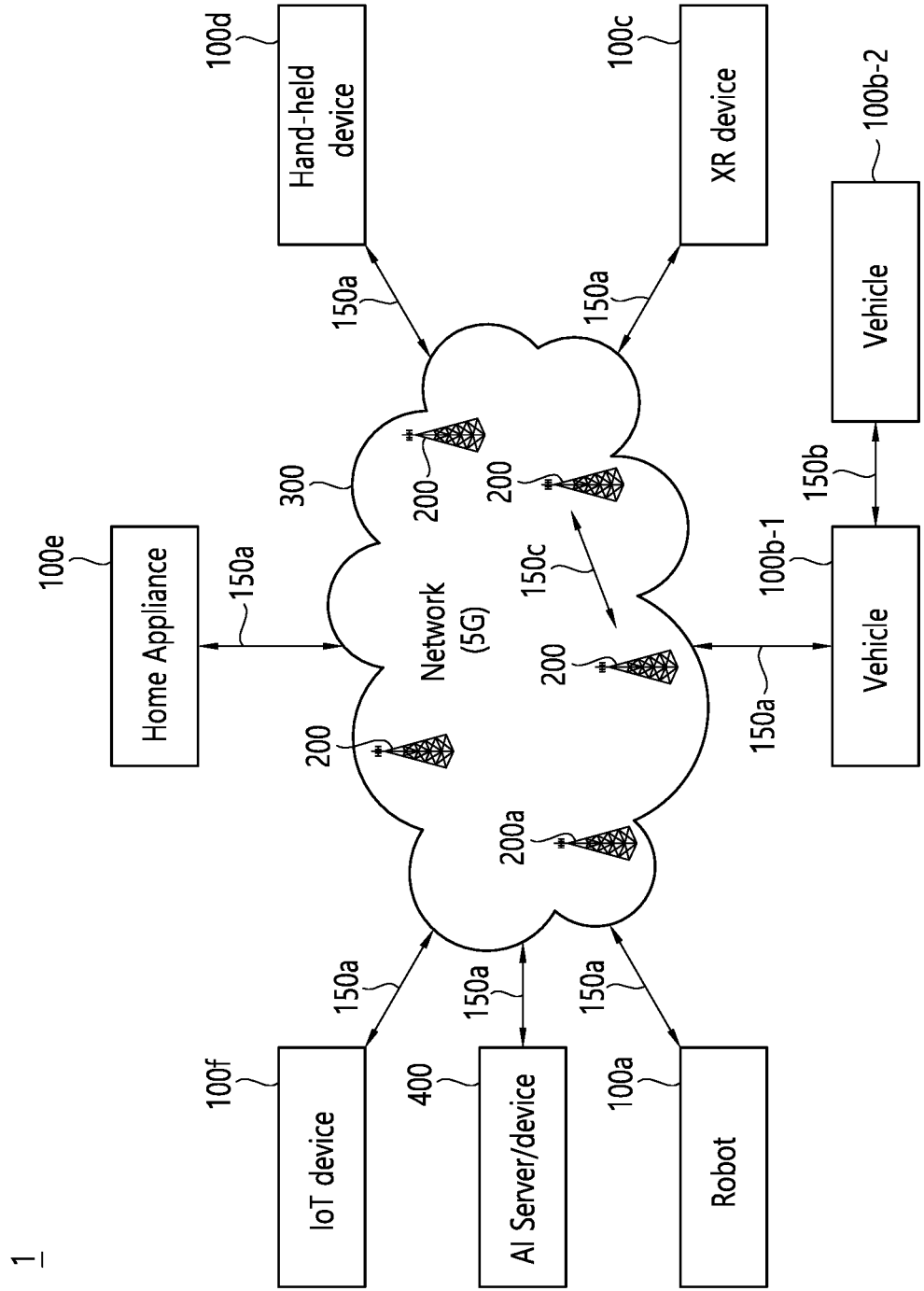
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a B S/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
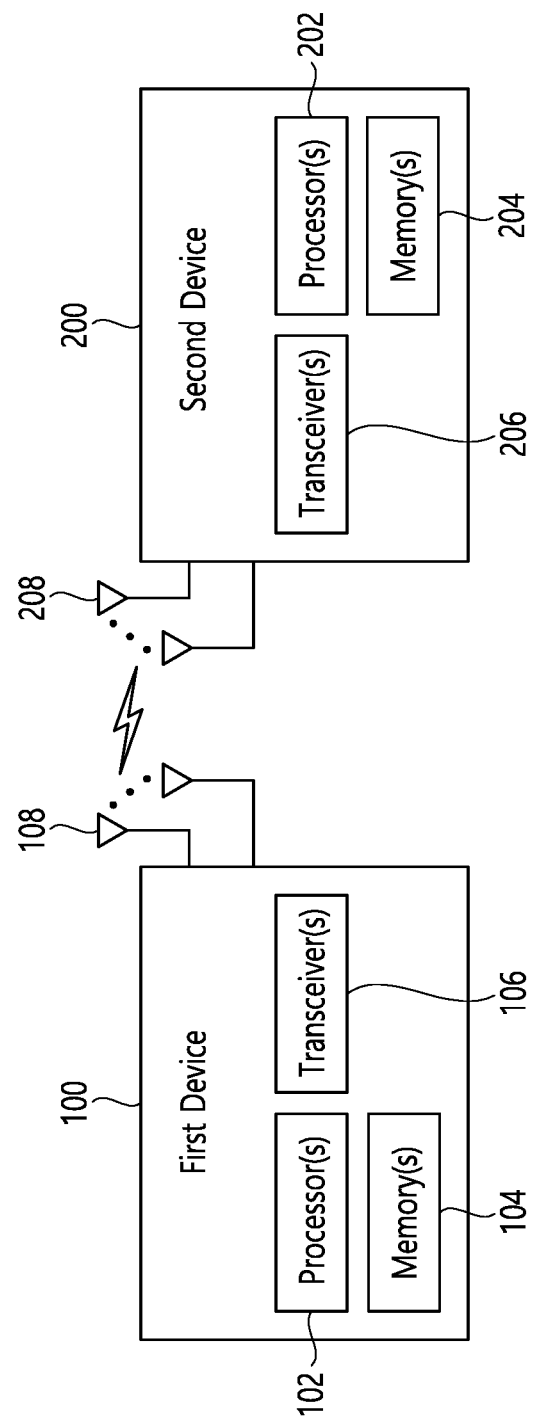
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
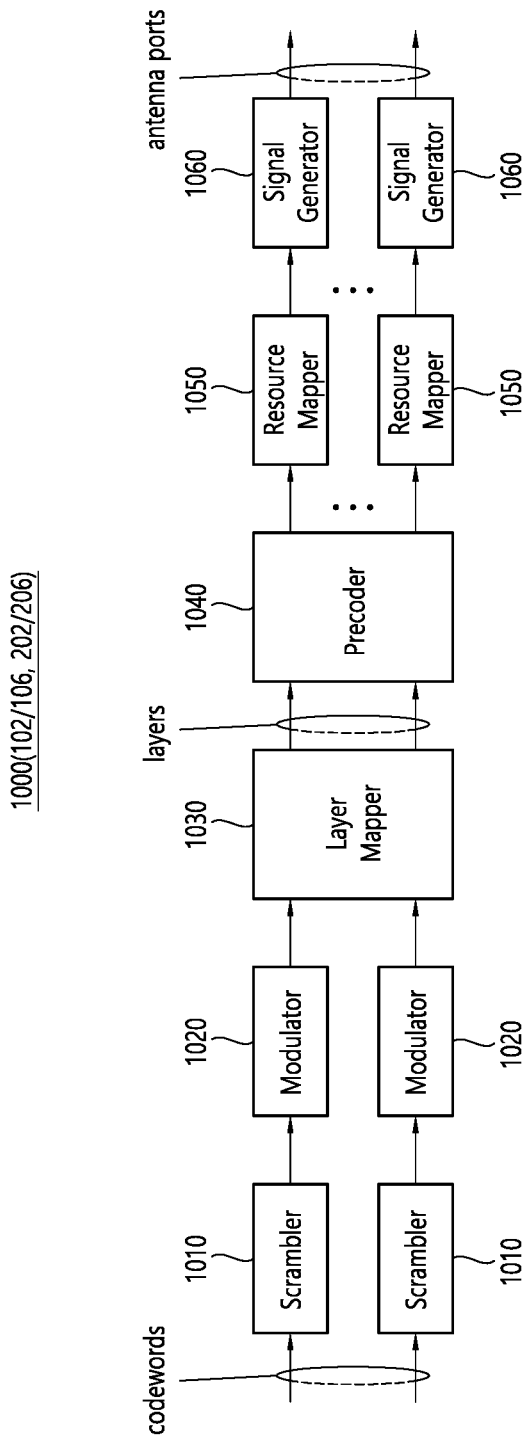
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BP SK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
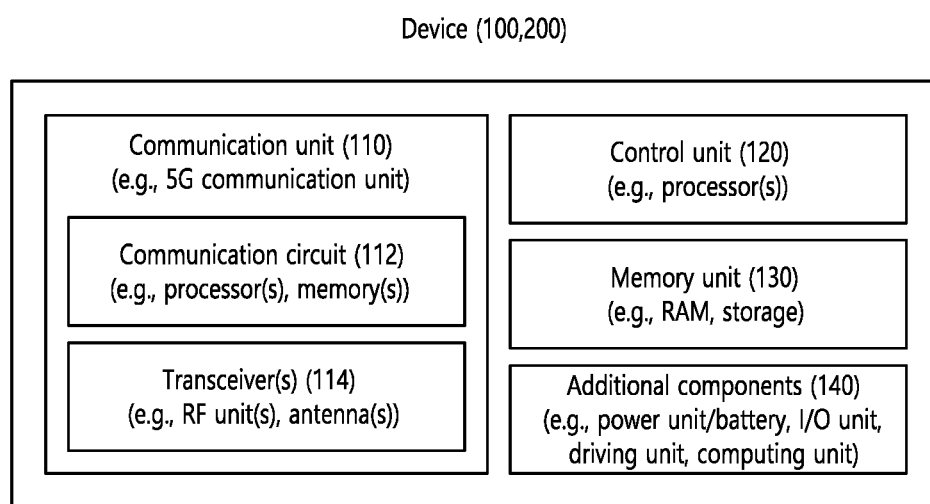
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
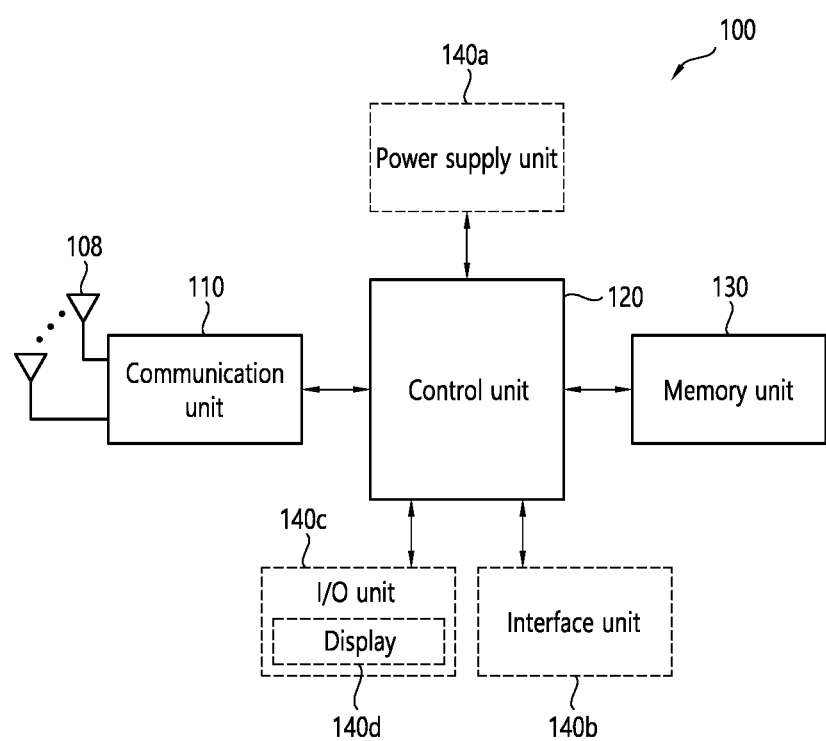
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
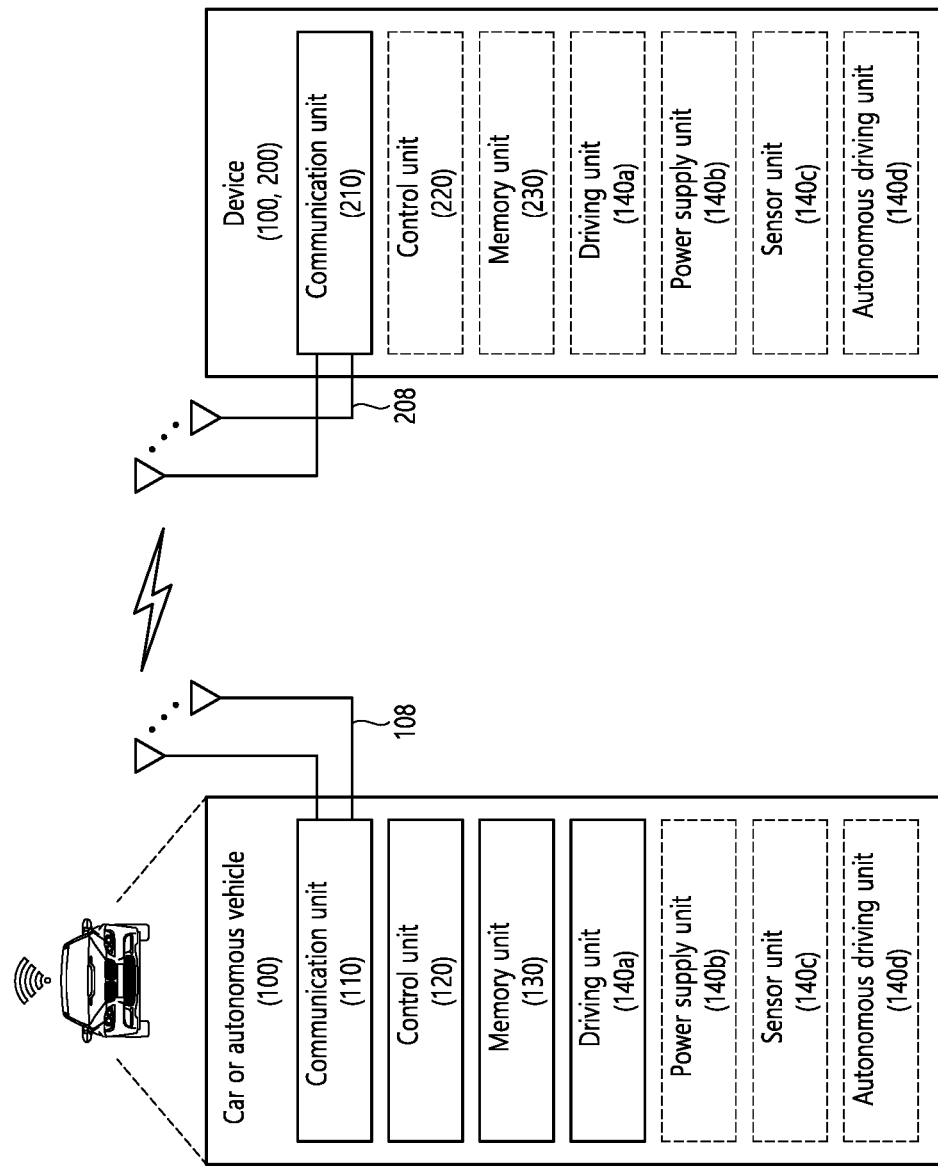
FIG. 22 shows a vehicle or an autonomous vehicle, based on an embodiment of the present disclosure.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:

triggering resource selection in a slot;
determining, based on the triggering, a time interval from the slot based on a remaining packet delay budget (PDB);
selecting a set of Y candidate slots within the time interval;
determining N slots for partial sensing before a first slot of the set of Y candidate slots;
performing the partial sensing for the N slots; and
selecting at least one sidelink (SL) resource based on the partial sensing for the N slots,
wherein a value of Y is a positive integer, and
wherein a value of N is a positive integer.

2. The method of claim 1, wherein the N slots for the partial sensing are determined based on only the first slot of the set of Y candidate slots.

3. The method of claim 1, wherein, based on that the resource selection is triggered by aperiodic transmission, the N slots for the partial sensing from the slot and before the first slot of the set of Y candidate slots are determined by the first device.

4. The method of claim 1, wherein the at least one SL resource is selected from among candidate SL resources within the set of Y candidate slots.

5. The method of claim 4, wherein a number of candidate SL resources is greater than or equal to X percent of a total number of candidate resources,
wherein a value of X is configured differently based on whether or not the first device is a device requiring power saving, and
wherein the value of X is a positive integer.

6. The method of claim 4, wherein, based on a number of candidate SL resources being less than X percent of a total number of candidate resources, and the first device being a device requiring power saving, reference signal received power (RSRP) threshold boosting to secure the number of candidate SL resources greater than or equal to X percent of the total number of candidate resources is not allowed for the first device, and
wherein a value of X is a positive integer.

7. The method of claim 1, further comprising:
transmitting, to a second device, sidelink control information (SCI) through a physical sidelink shared channel (PSSCH) based on the at least one SL resource.

8. The method of claim 7, wherein, based on whether or not the first device is a device requiring power saving, a parameter for mapping the SCI on resources related to the PSSCH is configured differently.

9. The method of claim 7, wherein, based on a resource selection method of the first device, a parameter for mapping the SCI on resources related to the PSSCH is configured differently, and
wherein the resource selection method includes random selection-based resource selection, partial sensing-based resource selection, or full sensing-based resource selection.

10. The method of claim 1, further comprising:
transmitting a demodulation reference signal (DMRS).

11. The method of claim 10, wherein, based on whether or not the first device is a device requiring power saving, candidate patterns for mapping the DMRS are configured differently.

12. The method of claim 10, wherein, based on a resource selection method of the first device, candidate patterns for mapping the DMRS are configured differently, and
wherein the resource selection method includes random selection-based resource selection, partial sensing-based resource selection, or full sensing-based resource selection.

13. The method of claim 1, wherein, based on whether or not the first device is a device requiring power saving, candidate modulation and coding scheme (MCS) tables are configured differently.

14. The method of claim 1, wherein, based on a resource selection method of the first device, candidate modulation and coding scheme (MCS) tables are configured differently, and
wherein the resource selection method includes random selection-based resource selection, partial sensing-based resource selection, or full sensing-based resource selection.

15. A first device adapted to perform wireless communication, the first device comprising:
at least one transceiver;
at least one processor; and
at least one memory connected to the at least one processor and storing instructions that, based on being executed, cause the at least one processor to perform operations comprising:
triggering resource selection in a slot;
determining, based on the triggering, a time interval from the slot based on a remaining packet delay budget (PDB);
selecting a set of Y candidate slots within the time interval;
determining N slots for partial sensing before a first slot of the set of Y candidate slots;
performing the partial sensing for the N slots; and
selecting at least one sidelink (SL) resource based on the partial sensing for the N slots,
wherein a value of Y is a positive integer, and
wherein a value of N is a positive integer.

16. A processing device adapted to control a first device, the processing device comprising:
at least one processor; and
at least one memory connected to the at least one processor and storing instructions that, based on being executed, cause the at least one processor to perform operations comprising:
triggering resource selection in a slot;
determining, based on the triggering, a time interval from the slot based on a remaining packet delay budget (PDB);
selecting a set of Y candidate slots within the time interval;
determining N slots for partial sensing before a first slot of the set of Y candidate slots;
performing the partial sensing for the N slots; and
selecting at least one sidelink (SL) resource based on the partial sensing for the N slots,
wherein a value of Y is a positive integer, and
wherein a value of N is a positive integer.

17. The processing device of claim 16, wherein the N slots for the partial sensing are determined based on only the first slot of the set of Y candidate slots.

18. The processing device of claim 16, wherein, based on that the resource selection is triggered by aperiodic transmission, the N slots for the partial sensing from the slot and before the first slot of the set of Y candidate slots are determined by the first device.

19. The first device of claim 15, wherein the N slots for the partial sensing are determined based on only the first slot of the set of Y candidate slots.

20. The first device of claim 15, wherein, based on that the resource selection is triggered by aperiodic transmission, the N slots for the partial sensing from the slot and before the first slot of the set of Y candidate slots are determined by the first device.

* * * * *